US007966229B2

(12) United States Patent
Vercellone et al.

(10) Patent No.: US 7,966,229 B2
(45) Date of Patent: Jun. 21, 2011

(54) METHOD AND SYSTEM FOR ACCOUNTING ACCESS BY USERS TO DATA NETWORKS, RELATED COMPUTER PROGRAM PRODUCT

(75) Inventors: Vinicio Vercellone, Turin (IT); Mario Ullio, Turin (IT); Gennaro Amelio, Naples (IT)

(73) Assignee: Telecom Italia S.p.A., Milan (IT)

( * ) Notice: Subject to any disclaimer, the term of this patent is extended or adjusted under 35 U.S.C. 154(b) by 187 days.

(21) Appl. No.: 12/087,927

(22) PCT Filed: Jan. 20, 2006

(86) PCT No.: PCT/EP2006/000504
§ 371 (c)(1),
(2), (4) Date: Aug. 22, 2008

(87) PCT Pub. No.: WO2007/082552
PCT Pub. Date: Jul. 26, 2007

(65) Prior Publication Data
US 2009/0125995 A1    May 14, 2009

(51) Int. Cl.
*G06Q 10/00*    (2006.01)
(52) U.S. Cl. ............... 705/28; 705/43; 705/44; 705/42; 726/4; 726/6
(58) Field of Classification Search .................. 705/42, 705/43, 44; 726/6, 4
See application file for complete search history.

(56) References Cited

U.S. PATENT DOCUMENTS

| 6,393,484 | B1 | 5/2002 | Massarani |
| 6,697,864 | B1 | 2/2004 | Demirtjis et al. |
| 6,792,457 | B1 * | 9/2004 | Zhang et al. ................. 709/224 |
| 6,854,014 | B1 * | 2/2005 | Amin et al. ................... 709/227 |

(Continued)

FOREIGN PATENT DOCUMENTS

WO    WO-2005/022893 A2    3/2005

OTHER PUBLICATIONS

T. Li et al.; "Cisco Hot Standby Router Protocol (HSRP)", Network Working Group, Request for Comments: 2281, Category: Informational, pp. 1-17, (1998).

(Continued)

*Primary Examiner* — Vanel Frenel
(74) *Attorney, Agent, or Firm* — Finnegan, Henderson, Farabow, Garrett & Dunner, L.L.P.

(57) ABSTRACT

A system for the time-based accounting of access by users to services provided by a data network includes a primary access node to provide access by users by establishing via the primary access node a steady connectivity between the users and the network. A secondary access node is associated with the primary access node, such secondary access node being configured for acting as a backup node to maintain connectivity in the case of failure involving the primary access node. The primary access node is configured for issuing a request for credentials for any user requesting access to said data network and, as a result of receiving valid credentials from the user, starts time-based accounting for the user. An authentication node cooperative with the primary access node and the secondary access node stores the secondary access node information items concerning the time-based accounting started for the user. The time-based accounting is thus maintained in the case of failure involving the primary access node as connectivity is maintained by the secondary access node.

24 Claims, 15 Drawing Sheets

U.S. PATENT DOCUMENTS

| | | |
|---|---|---|
| 6,912,197 B2 | 6/2005 | Mahamuni |
| 2005/0204050 A1 | 9/2005 | Turley et al. |
| 2005/0204168 A1 | 9/2005 | Johnston et al. |
| 2008/0120703 A1* | 5/2008 | Morris et al. .................. 726/4 |
| 2008/0172459 A1* | 7/2008 | Cross et al. .................. 709/204 |

OTHER PUBLICATIONS

R. Hinden, "Virtual Router Redundancy Protocol (VRRP)", Network Working Group, Request for Comments 3768, Obsoletes: 2338, Category: Standards Track, pp. 1-27, (2004).

* cited by examiner

METHOD AND SYSTEM FOR ACCOUNTING ACCESS BY USERS TO DATA NETWORKS, RELATED COMPUTER PROGRAM PRODUCT

CROSS REFERENCE TO RELATED APPLICATION

This application is a national phase application based on PCT/EP2006/000504, filed Jan. 20, 2006.

FIELD OF THE INVENTION

The present invention relates to techniques for accounting (or "billing") access by users to data networks.

The invention was developed with specific attention paid to its possible use in a context wherein a data network is accessed both by users to which a "flat" (i.e. time-independent) accounting scheme applies and by users that retain a time-based accounting scheme.

DESCRIPTION OF THE RELATED ART

Nowadays, access to data networks based on the IP protocol (Internet Protocol) typically involves the establishment of logical connections realized through PPP (Point-to-Point Protocol) protocol sessions. This applies in particular for clients connected on copper lines that use xDSL-type (Digital Subscriber Line) transmission techniques, that is so-called Broadband Access techniques. These techniques are usually designated "virtual dial-up" as they simulate a traditional Narrowband Access connection based on the use of modems to establish over the telephone network calls (Dial-up) terminated at the point of presence (PoP) of the Internet Service Provider (ISP).

In such an arrangement, IP access functionalities are supplied by specialized edge routers, the BRAS (Broadband Remote Access Server), these systems terminate the access connections and perform the routing functions for the client traffic.

Figure 1:
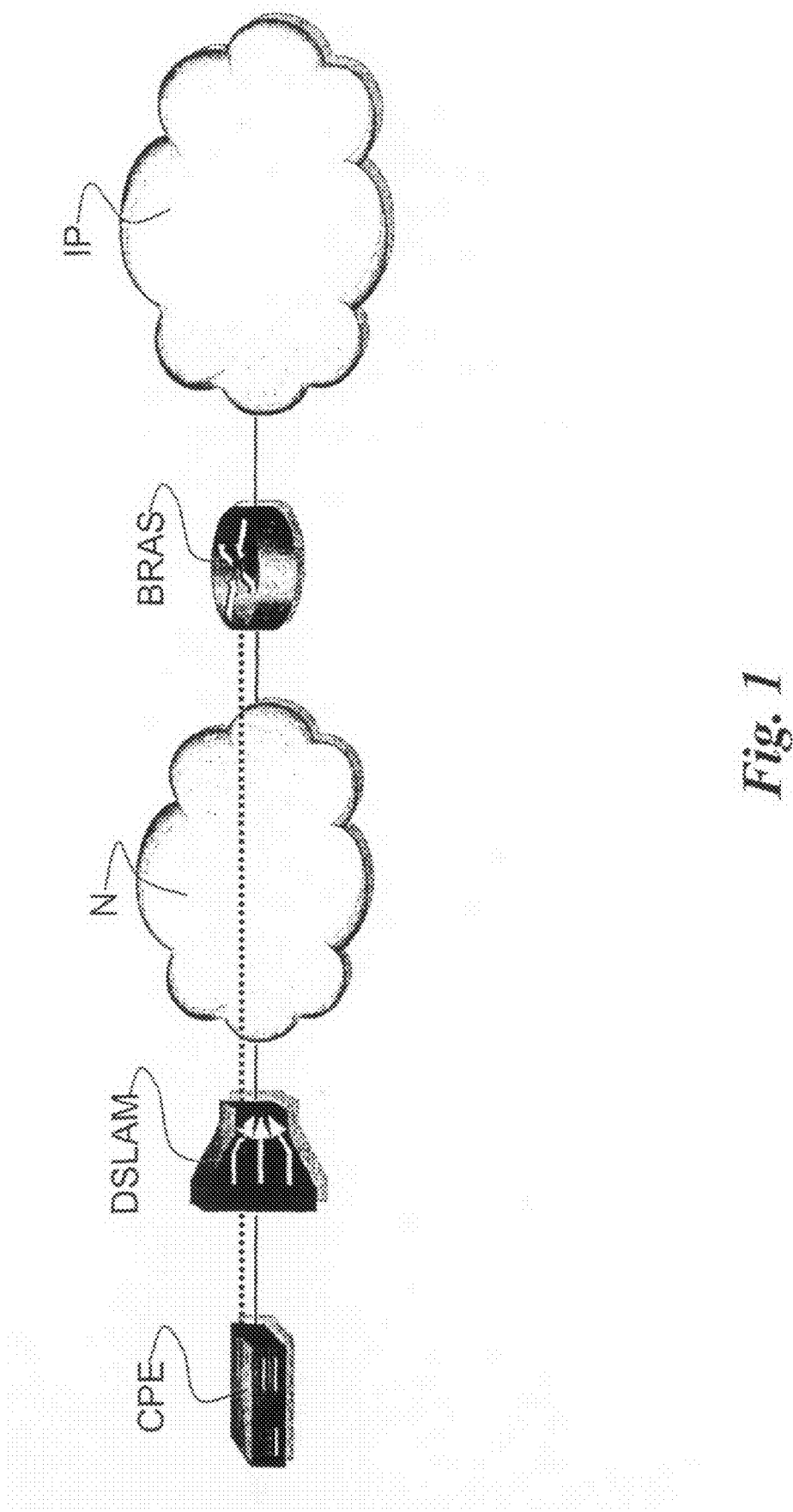

A typical reference network configuration is represented by way of example in FIG. 1, where the reference CPE designates a user terminal. The terminal CPE connects via a so-called DSLAM (Digital Subscriber Line Access Multiplexer) to a broadband access network N (e.g. an Ethernet) in order to reach dedicated access nodes such as BRAS edge routers that provide connection to an IP network, e.g. the Internet.

An increasing interest is being currently witnessed for the adoption of "always-on" type access models; in that case, the terminal has a "steady" connectivity to the network, without the need of previously establishing a layer 2 logical connection by means of a protocol such as the PPP protocol. The evolution towards an ever increasing use of the "always-on" models is also motivated by the need of an integrated offer, on xDSL broadband access lines, of VoIP (Voice over IP) and video communication services; in fact, for this type of applications, the terminal must always be on-line and reachable from the network.

The adoption of an "always-on" type of connection (i.e. a steady connectivity) creates however a problem in respect of those clients and services that, particularly in case of data services, may need/wish to be charged for their access on the basis of the duration of the "session" (time-based accounting).

Arrangements currently adopted to manage a time-based accounting/billing adopt (possibly in combination) two approaches, namely:
  a Service Selection architecture, based on the interaction with a dedicated service access Web portal, or
  a dynamic address assignment functionality through DHCP (Dynamic Host Configuration Protocol) servers.

In the case of a Service Selection architecture, a Web portal is provided to interface with those clients wishing to access services with a time-based accounting. The Web portal allows the selection of the desired service among those offered from the network. This occurs by using the HTTP (HyperText Transfer Protocol) protocol, through an edge element of the IP network (this is called Service Selection Gateway or SSG in the case of the manufacturer Cisco): the client opens the HTTP browser and his traffic is re-directed by the SSG towards the Web server, that hosts the services access portal, located on a specific IP subnet. The Web server asks the client for its authentication credentials and, if that step is successful, the Web server presents to the client a menu of the available services out of which the service desired may be selected. Upon a service request, the SSG creates an appropriate session and starts the associated RADIUS accounting function.

In those solutions based on the use of the DHCP functionality, the client obtains, by interacting with the DHCP server, an IP address characterized by a certain time validity, usually called "lease time". The validity period of the address can be periodically renewed. When assigning an address to a client, the DHCP server creates an adequate association (DHCP binding). The address is normally released following an explicit client indication, following the network disconnection.

Turning specifically to the patent literature, WO-A-2005/022893 describes a solution for managing client sessions in a cable access network. This solution is based on a login server, that operates jointly with a DHCP server to configure the client apparatus (CPE) and the network termination (cable modem) managed by the operator. After receiving the IP address from the DHCP, the login client on the CPE transmits to the login server, through a secure socket layer (SSL), the credentials entered by the user (login and password). The login server sends them to the RADIUS server for authentication and, if this is successful, receives from the DHCP server the IP address of the home CMTS (Cable Modem Termination System) of the client and the MAC address of the cable modem. Further, it generates a session record that is specific for the client (containing session information, including the start time) and interacts with the CMTS (via SNMP) to reconfigure the filter rules in order to allow traffic originating from the cable modem. Finally, it sends a confirmation message to the login client that starts sending periodical "hello" messages to the login server.

U.S. Pat. No. 6,393,484 describes a solution for managing a network controlled access through the use of DHCP and associated authentication functions. The user initially contacts the DHCP server to obtain an IP address in order to have network access. After a security verification on the client's MAC address, the DHCP server assigns an IP address that is tagged with a temporary state. In that step, the DHCP can optionally configure on the edge router restrictive filter rules, to limit access only to certain IP addresses, for example, a login server. When the timer expires, if the authentication is unsuccessful, the address is withdrawn, while the filter rules and the associations are removed.

US-A-2005/0204168 describes a solution for controlling access to a network by using a Network Access Controller. This solution involves the re-direction towards a Pre-Authentication Capture Destination; the latter consists in a group of servers (a so-called "Walled Garden" or WG) accessible also by the users not yet authenticated.

U.S. Pat. No. 6,697,864 describes a solution for controlling access to a network, such as the Internet, through a session-based login mechanism, based on the establishment of a PPTP (Point-to-Point Tunneling Protocol) connection and the use of a PPP session for the authentication. Through an initial interaction with a DHCP server, the client obtains a "restricted" IP address, which allows only a limited access to an area of the network that includes a "Walled Garden". Access to the external network involves the use of a PPTP/PPP session where the user is authenticated and obtains a public IP address that allows him for example to access the Internet.

US-A-2005/0204050 describes a solution for controlling the access to different network logical "regions"; these regions can coincide with one or more "Walled Gardens" or with a set of them. The set of rules that define the permissions for the various clients are maintained and managed by a network gateway element.

U.S. Pat. No. 6,912,197 describes a solution that maintains, by providing a redundancy in network access points, the connections based on a Multilink-PPP (MLPPP) protocol towards a "peer" node in the case of failure of the node that actively manages the protocol sessions (Active). This occurs requiring the exchange of state synchronization information between the Active and the Standby node.

OBJECT AND SUMMARY OF THE INVENTION

The above discussion of the prior art indicates that managing PPP sessions may absorb a significant amount of the processing capacity of a node such as a BRAS. In fact, the increasing load deriving from PPP session management related to the a large number of clients and sessions per client, is one of the factors limiting the number of clients that can be homed on a BRAS, thus affecting the scalability of the solution.

A further reason that suggests to devise an alternative solution to PPP is related to the management of service access redundancy. The Applicants have observed that, by using the traditional model based on the PPP protocol, any possible fault causes the on-going session to be lost, and service recovery requires that a new PPP session is set up on an alternative BRAS. That procedure inevitably leads to inappropriately high recovery times. This applies primarily to those services subject to strict requirements in terms of availability, VoIP services being a case in point. When one desires to reduce inefficiency to a minimum and maintain the active session on an alternative BRAS, complex procedures must be implemented in order to synchronize the information related to the active sessions. This involves a continuous exchange of alignment messages between the active and standby BRAS nodes.

On the other hand, in an "always-on" connectivity scenario, without using the PPP protocol, the simple and straightforward time-based accounting criteria based on the set-up and release of a PPP connection will no longer be available: the need is thus felt for an alternative mechanism for introducing the notion of a session in such a scenario.

The Applicants have noted that, in a Service Selection architecture as described in the foregoing, the re-direction performed by the SSG towards the Service Selection Web portal is active only for the HTTP traffic and this requires opening a preliminary HTTP session also in the case where the needs exists of establishing a session using different application protocols (e.g. FTP, etc.) or a generic data session, transparent to the protocol types transported on the IP layer.

In the case of those prior art solutions based on the use of DHCP functionality, the Applicants have noted that a client may disconnect from the network without releasing the address. In that case the DHCP server removes the related association only when the configured lease time expires. While the initial address request to the DHCP server can in fact be used to start a time-based accounting procedure, the accounting end can be adversely affected in terms of accuracy if the client disconnects without sending an explicit disconnection message, thus making it necessary to wait for the lease time expiry. The Applicants have also observed that a reduction in the value of the lease time entails a more frequent interaction in terms of messages with the DHCP server, thus finally limiting scalability.

Concerning specifically the arrangement described in U.S. Pat. No. 6,912,197 the Applicants have observed that this prior art solution essentially provides a method of reducing the quantity of information exchanged: instead of always transmitting the whole of the sequence numbers related to each transmitted fragment, the Active node updates the Standby node only periodically, thereby limiting the message exchange overhead. This means that the Standby node is not always in possession of the sequence number related to the last transmitted fragment: the Active node may have in fact transmitted other fragments after the last message with the sequence number update. In the case of a switchover, the value of the sequence number stored on the Standby node being not updated may give rise to problems in the reconstruction of the packets; for that reason, according to the prior art solution in question, before sending an update of the sequence number, the Active node increments its value of a quantity called JUMP-COUNT, whose amount is calculated depending on the maximum number of fragments expected to be transmitted in the interval between two subsequent update messages. In any case, also this prior art solution involves the use of traditional network access modes based on the establishment of PPP protocol sessions.

The object of the invention is thus to provide an improved solution that dispenses—in a satisfactory manner—to the shortcomings and drawbacks of the prior art arrangements discussed in the foregoing.

More in detail, a specific problem underlying the invention is to provide an improved arrangement that makes it possible, in the presence of an "always-on" type of connection in a data network, a time based accounting on the basis of a robust, fault tolerant mechanism, so that clients and services can be charged for their access on the basis of the duration of the session. In particular, referring to models based on the PPP protocol, any possible fault causes the on-going session to be lost, and service recovery requires that a new PPP session is set up on an alternative BRAS. That procedure inevitably leads to inappropriately high recovery times.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The claims are an integral part of the disclosure of the invention provided herein.

A preferred embodiment of the arrangement described herein is thus a method for time-based accounting (or billing—these two words being herein used as mutually equivalent), namely accounting as function of time, access by users to services provided by a data network, wherein said access by users is provided via at least one primary access node by establishing via said at least one primary access node a steady connectivity between the users and the network, the method including the steps of:

- associating with said at least one primary access node at least one secondary access node configured for acting as a backup node to maintain said connectivity in the case of failure involving said at least one primary access node;
- providing an authentication node cooperative with said at least one primary access node and said at least one secondary access node;
- issuing a request for credentials for any said user requesting access to said data network,
- as a result of receiving valid credentials from said user, starting time-based accounting for said user, and
- said authentication node storing in said at least one secondary access node information items concerning said time-based accounting started for said user, whereby said time-based accounting for said user is maintained in the case of failure involving said at least one primary access node as said connectivity is maintained by said at least one secondary access node.

The arrangement described herein involves a new type of protocol, designated Session Control Protocol, whereby a client session can be established and managed to permit access to the services of a data network (such as for example the Internet network). Preferably, the session activation mechanism for a new user is implicit in the attempt to access an IP address not belonging to a subset of allowed addresses. Still preferably, the activation of a new session corresponds to the creation of a new instance of the protocol state machine in the network that, by co-operating with a state machine provided on the client side, manages the session life cycle. This preferred session mechanism, jointly with the authentication functions proper, makes it possible to apply to a client a time-based accounting principle for the use of the data network; additionally, the access session to the network is protected against the occurrence of network faults through a robust, fault tolerant mechanism. This mechanism can be applied to maintain the session active also in the case of failure of the primary access node; in that case the session is in fact re-routed towards a secondary access node.

This preferred fault tolerant mechanism minimizes the amount of state information that needs to be maintained on the access node. Additionally, in the case of the arrangement described herein, exchanging synchronization messages between the access nodes for the management of redundancy is no longer necessary; this leads to a substantial simplification in the access node state machine to the benefit of the scalability of the solution.

To sum up, the arrangement described herein makes it possible—on the basis of a robust, fault tolerant mechanism—to apply to clients and services that may need/wish it a time-based accounting (e.g. being charged for their access on the basis of the duration of the "session") also in the presence a connection of the "always-on" type (i.e. a steady connectivity). Additionally, the session mechanism is activated implicitly and does not use e.g. the SSL protocol, while also defining an alternative mechanism to the PPP protocol for indicating the start and the end of user sessions, this resulting in a simpler session form. The arrangement described herein also provides precise access modes and mechanisms to establish a session and related modes and/or protocols.

BRIEF DESCRIPTION OF THE ANNEXED REPRESENTATIONS

Figure 2:
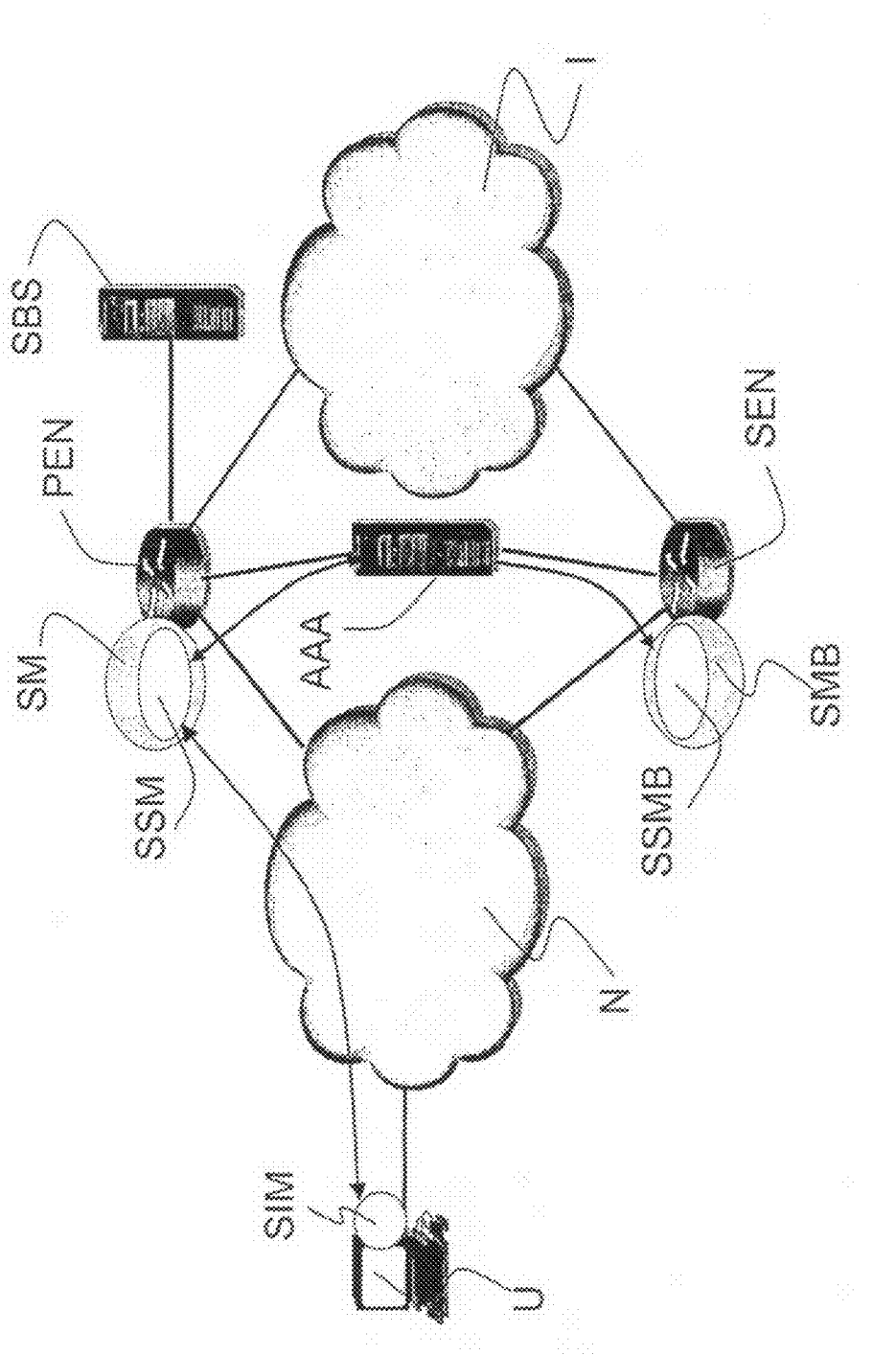
Figure 5:
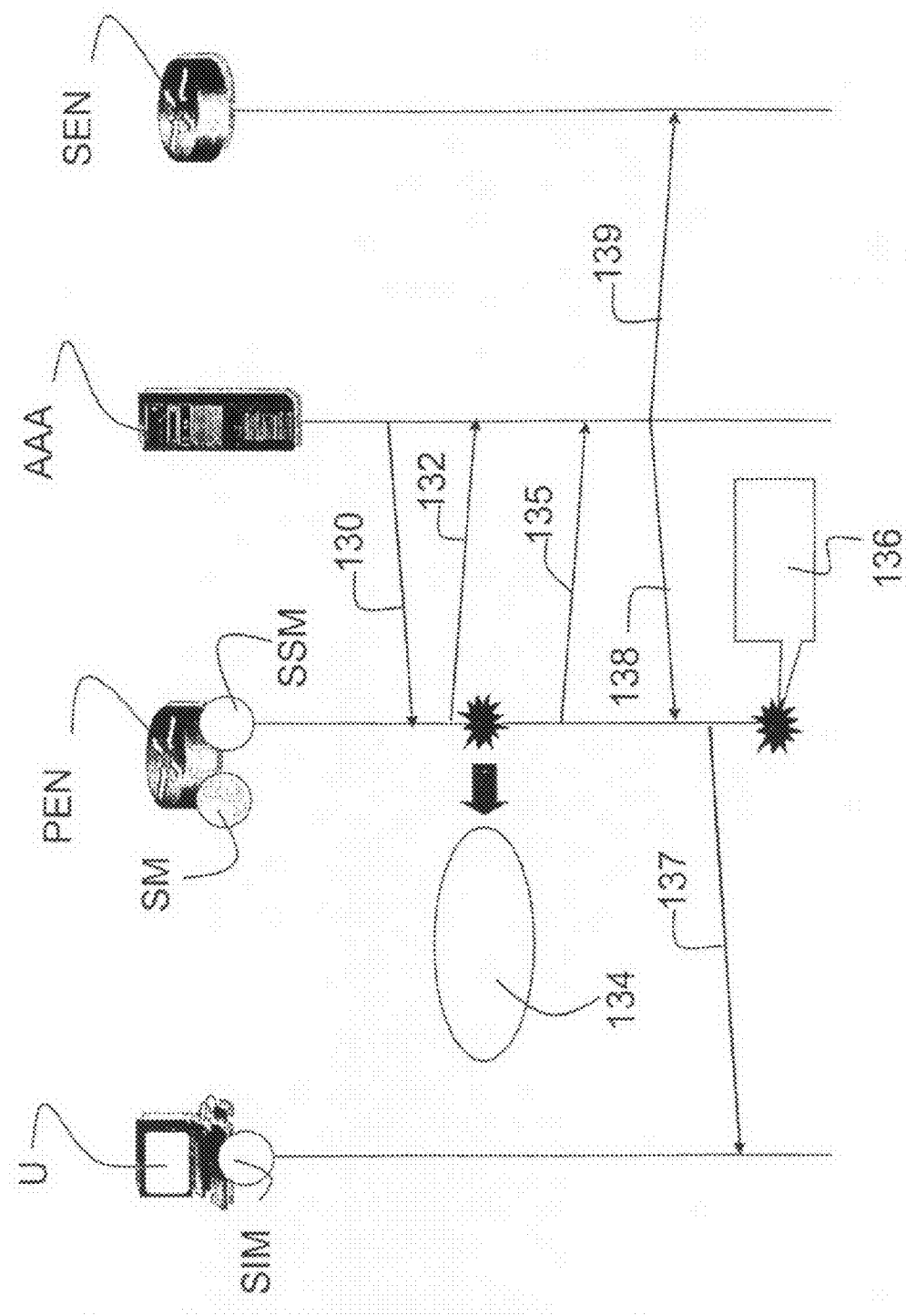
Figure 6:
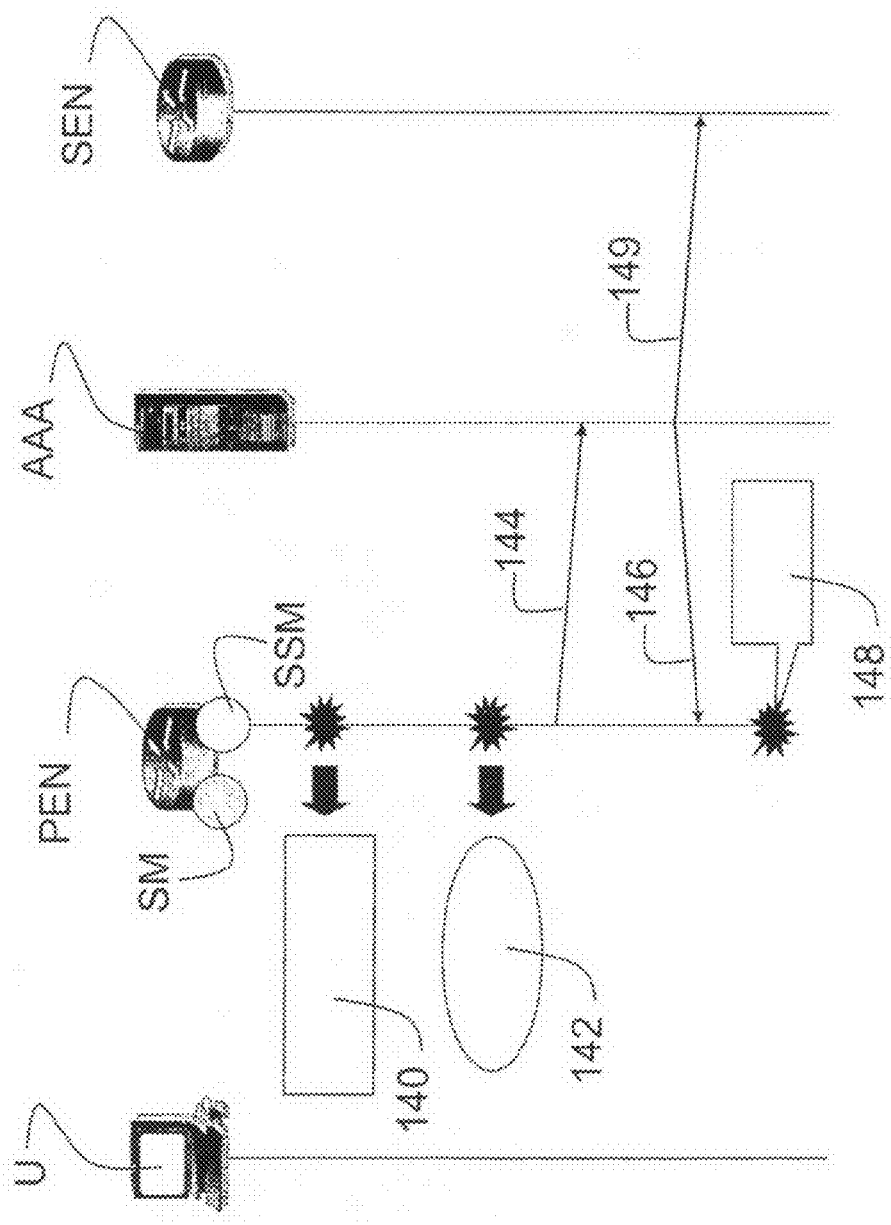
Figure 7:
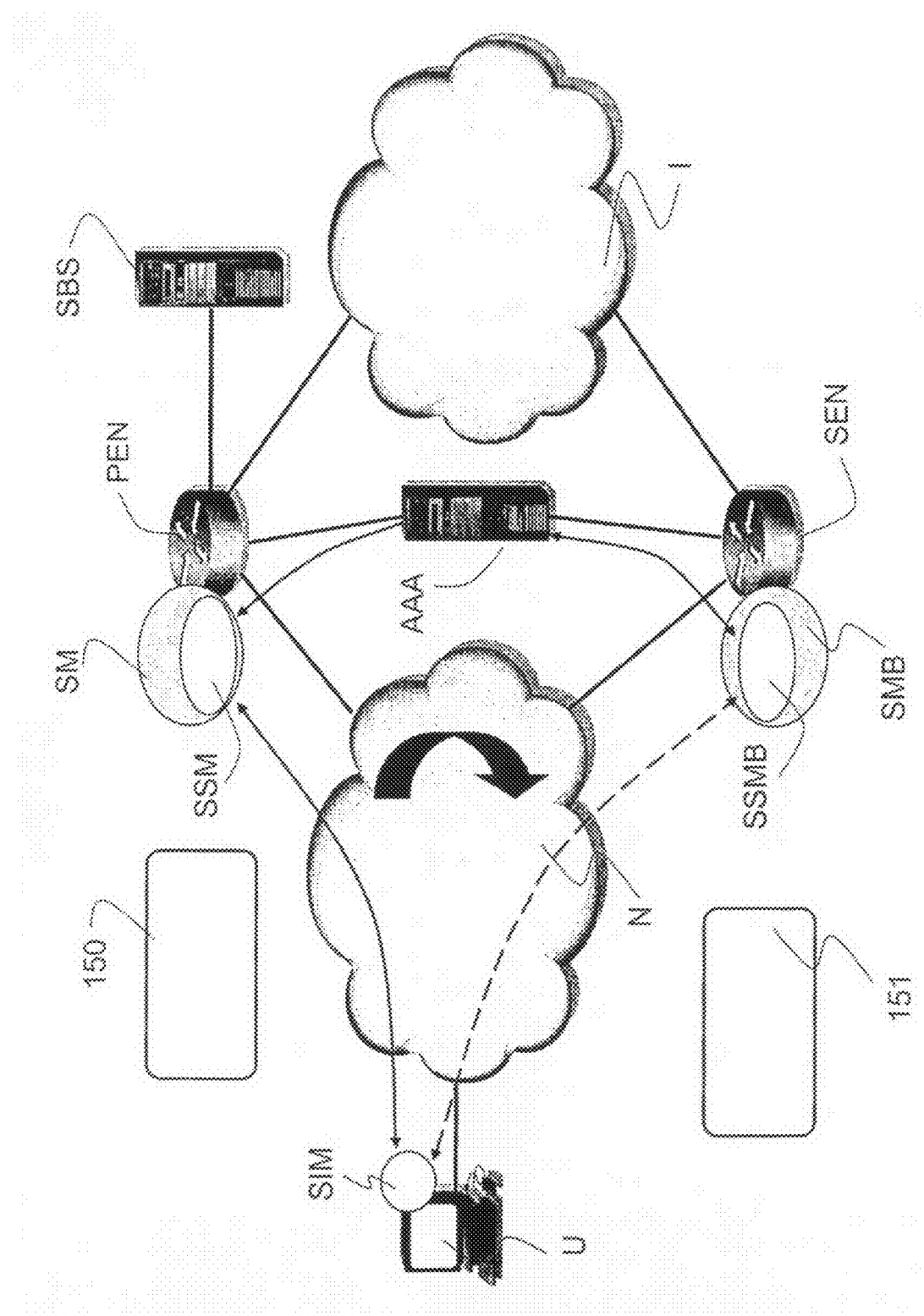
Figure 8:
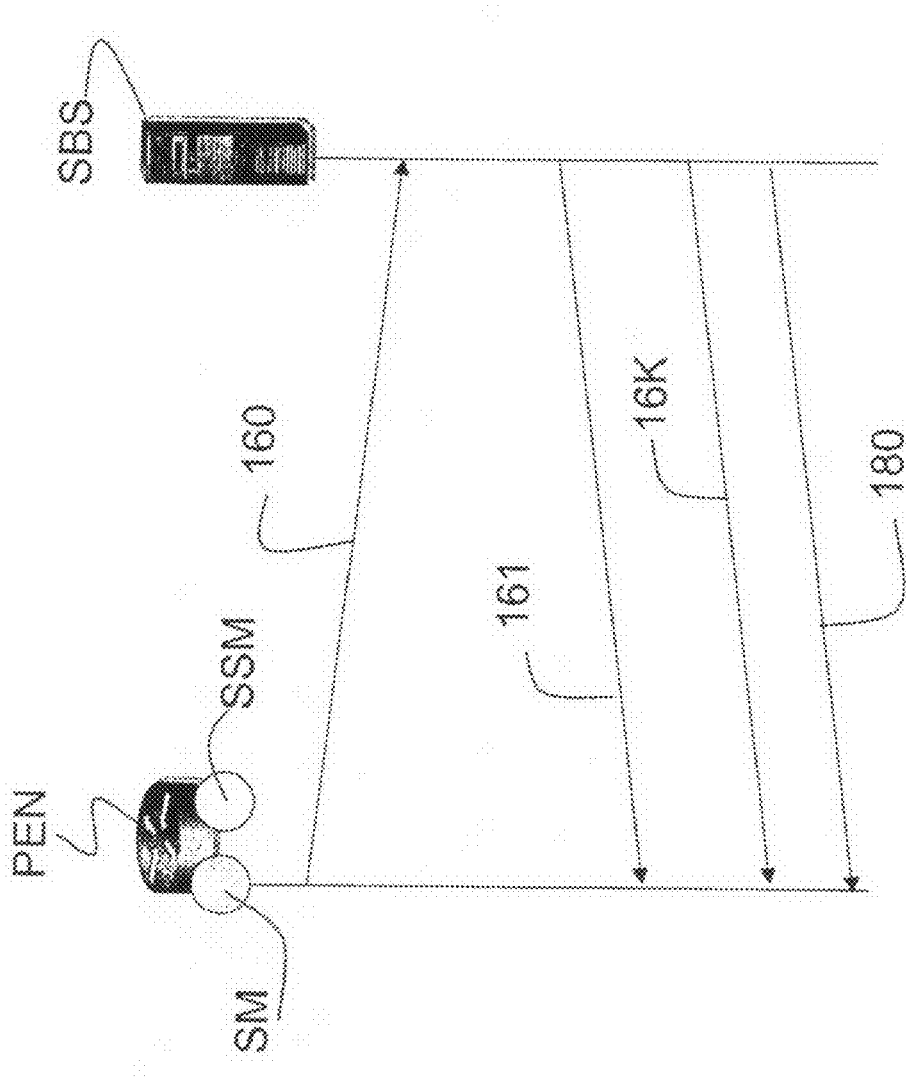
Figure 9:
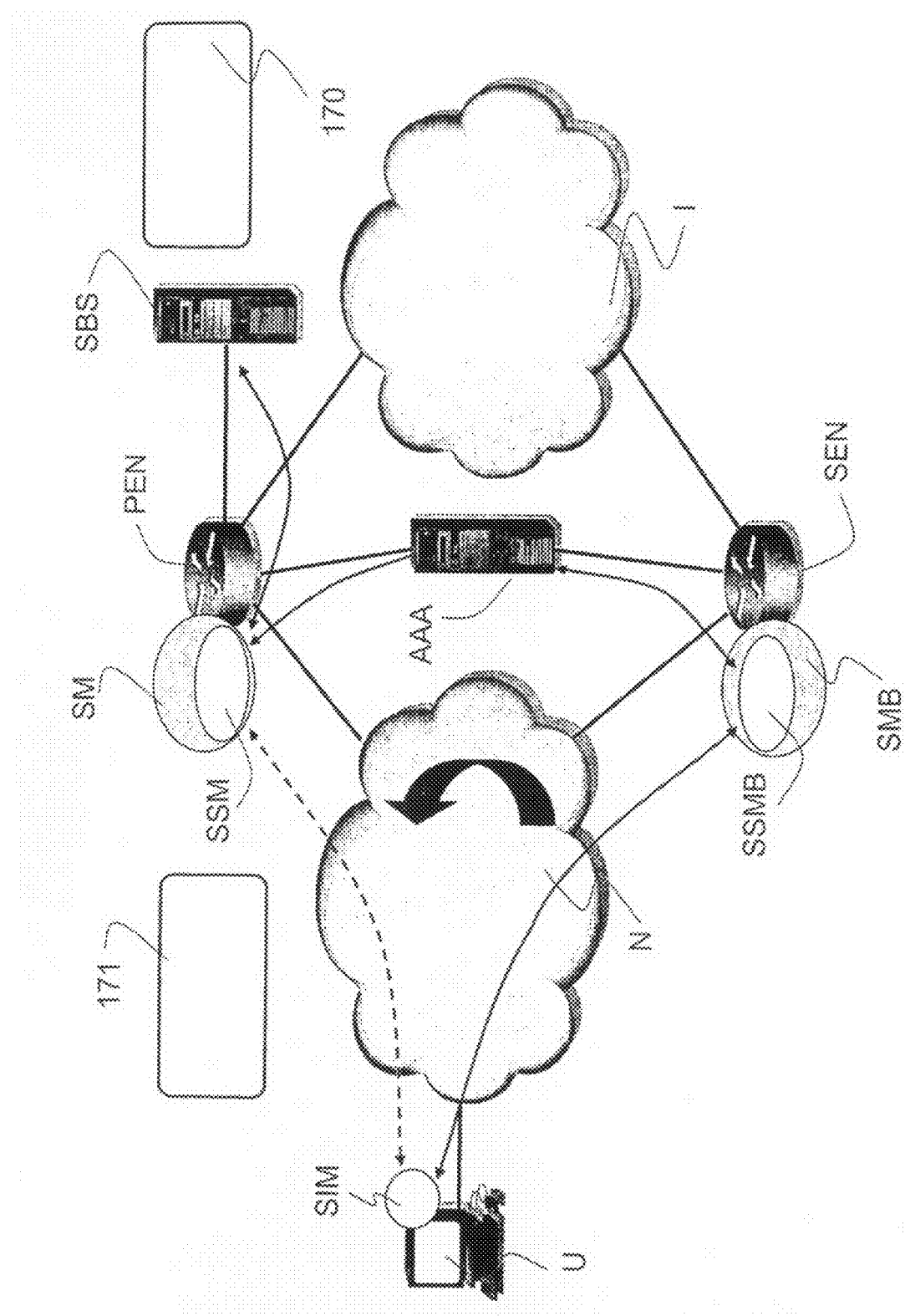

The invention will now be described, by way of example only, with reference to the enclosed figures of drawing, wherein:

FIG. 1 has already been described in the foregoing,

FIG. 2 is schematically representative of a typical context of use of the arrangement described herein, FIGS. 3 to 6 are time diagrams exemplary of the exchange of signals within the framework of the arrangement described herein, FIG. 7 is schematically representative of handling of a node failure within the arrangement described herein, FIGS. 8 and 9 are exemplary of reactivation of a node within the arrangement described herein, and FIGS. 10 to 15 are exemplary of the structure and operation of various state machines included in the arrangement described herein.

DETAILED DESCRIPTION OF PREFERRED EMBODIMENTS OF THE INVENTION

The following description of an exemplary embodiment of the invention is primarily related to the structure and operation of a protocol designated the Session Control Protocol (SCP). This is a protocol that is able to manage an application level session between residential users and edge nodes while also guaranteeing service protection through session recovery mechanisms on a secondary access node in a backup function.

The reference scenario considered is illustrated in FIG. 2.

A customer equipment for each user U generates IP traffic towards an access network N (e.g. a packet network such as an Ethernet) to obtain access to a data network I such as the Internet via at least one access node designated the primary access node PEN. In the present description the term "access node" refers to an edge router, e.g. the BRAS (Broadband Remote Access Server), which terminate the user access connections and perform the routing functions for the client traffic.

The users U are further able to access (after have authenticated themselves with an authentication node designated AAA) a certain number of network resources, typically servers, not shown in figure, that jointly define what is currently referred to as a Walled Garden (WG), namely a browsing environment that controls the information and the Web sites a user is able to access.

In the arrangement shown, access of users U to the network I is thus provided via at least one primary access node (i.e. the primary edge node PEN) by establishing via that primary access node a steady connectivity between the users U and the network I.

At least one secondary edge node, designated SEN, is provided to act as a backup access node for the primary node in the case of failure of the primary node PEN as better detailed in the following.

In the exemplary embodiment described herein, it will be assumed that the access network N implements only the first two layers of the OSI stack and can be realized with any technology, for example Fast or Gigabit Ethernet, and connects the users to the edge nodes such as PEN or SEN. The access nodes such as PEN or SEN communicate with the AAA server, through a protocol such as Radius.

The following is a short description of the elements/modules involved in the operation of the arrangement described herein.

The Session Initiator Module SIM is an agent running on the user equipment with the main role of exchanging messages with the SSM module described in the following in order to set-up, maintain and terminate user sessions.

The Session Manager module SM runs on the primary edge node PEN; it deals with the creation of new SSM module instances—as better described in the following—when a user wants to establish a session; the Session Manager module SM also gathers the information on the sessions that have been diverted on the secondary node, in case the primary node returns to the active state.

The Single Session Manager module SSM (created as a new instance for each session by the Session Manager module SM) implements the protocol logic, thus being the entity that deals with the session management and that communicates with the SIM module and with the authentication server AMA.

Simplified, backup versions of the modules described in the foregoing are provided at the secondary edge node SEN.

These include a Session Manager Backup module SMB, which runs on the secondary edge node SEN and deals with the storage of the information sent from the AAA server and with the creation of the SSMB instances when the primary edge node PEN fails.

The Single Session Manager Backup SSMB module is a reduced version of the SSM module. In fact, unlike the SSM module, the SSMB module will not deal with the creation of any session.

A Sessions Backup Server SBS is used by the SM module to obtain information on the sessions diverted on the secondary node.

The AAA "server" is essentially an AAA (Authentication Authorization Accounting) module used by the SSM module to perform the user credentials control operations and for accounting.

The connections shown in FIG. 2 among the access (edge) nodes PEN, SEN, the Sessions Backup Server SBS and the AAA "server" are not to be considered necessarily as direct physical connections, but as logical connections.

The Session Control Protocol described herein is a fault tolerant protocol able to manage sessions between users and access routers. It provides an alternative to protocols such as PPP in explicitly indicating the start and stop (end) of user sessions.

The main features are simplicity and robustness in respect of network faults. The protocol is thus kept as simple as possible in order to render it more scalable while also ensuring service protection: if the node on which a session is established fails, the session will not be interrupted, but rather diverted to a secondary, backup node as better detailed in the following.

Once authenticated, users are able to access a Walled Garden (WG), the authentication having the sole purpose of proving that the user has subscribed a contract with the Internet Service Provider (ISP). In a scenario wherein users are always-on ("steady connectivity"), authentication can be performed as the user U activates (e.g. switches on) the equipment used to connect to the network. However, that type of authentication does not permit the users to gain full connectivity to data services, e.g. to access the Internet. In order to do so a session is to be established, which requires a further level of authentication. Using two levels of authorization results in increased flexibility; in fact it is possible, for example, that sessions may be activated from a same machine with different credentials (obviously not simultaneously) and by using the same first level authentication.

Figure 3:
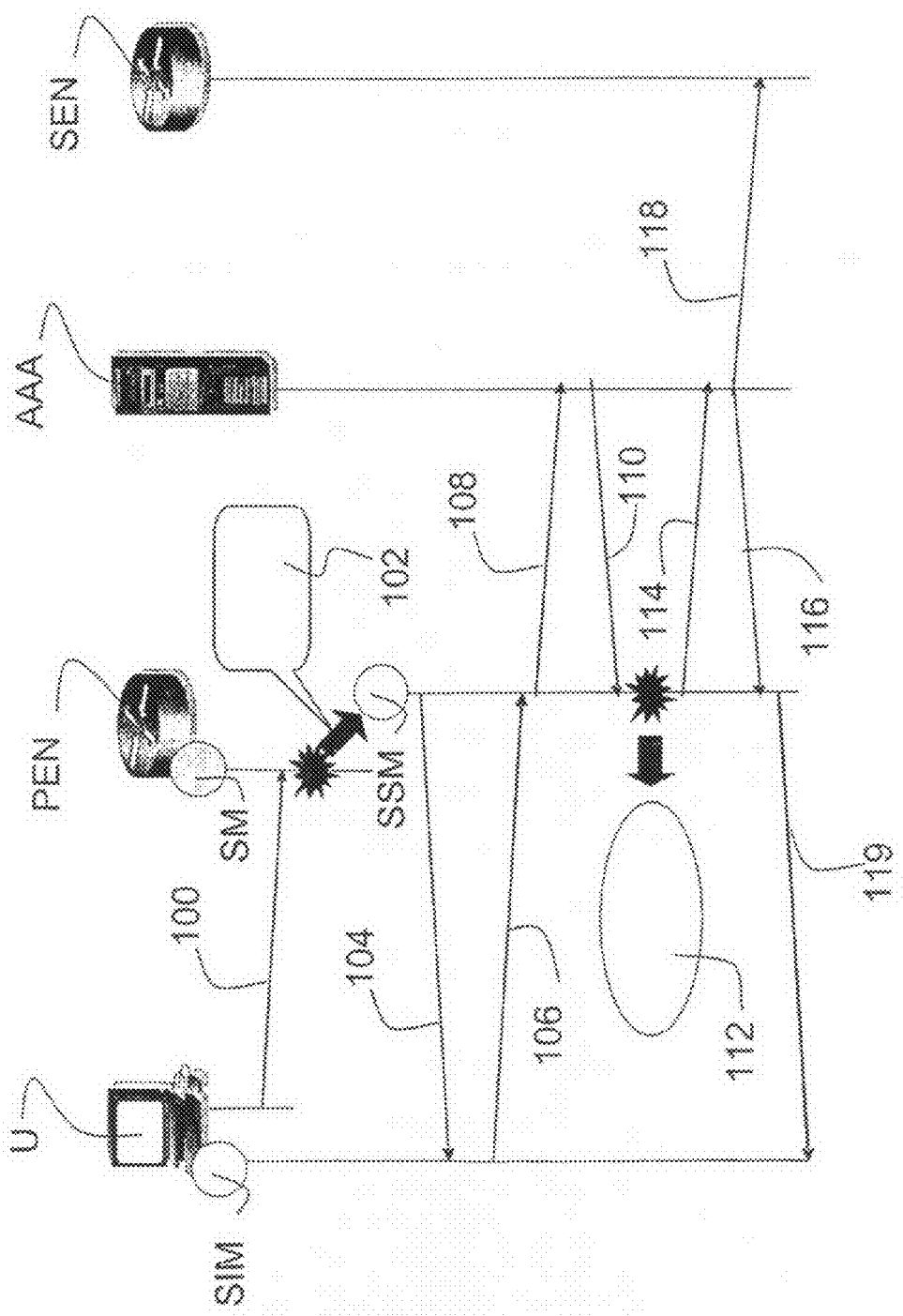

The sequence of the operations performed to create a session is represented by the time diagram of FIG. 3. In the arrangement described herein, the users U do not explicitly ask the edge node PEN to establish a session. A preferred option is to ensure that, by controlling the received traffic, the PEN router can determine if the user wants to reach any machines external to the WG. Modern routers perform such operations at wire-rate, therefore the option selected does not cause router operations to be slowed down.

The primary edge node PEN therefore controls the destination of all the incoming packets.

If the destination is internal to the WG, the packet is routed according to the routing protocol in execution. If the destination is instead external to the WG the packet is sent to the SM; such control is performed through the use of an Access Control List (ACL). In general an ACL specifies a set of rules that the packets can satisfy, based on the contents of the relevant header fields; in the exemplary case considered here the ACL is configured to filter the incoming packets based on whether their destination address matches with one of the address prefixes assigned to the machines belonging to the WG.

Therefore, when the router receives a packet, it checks whether the destination belongs to the WG. Then, in the negative case, it checks whether the sender has already established a session and, depending on the result of this operation, it sends the packet to the SM or to the addressee.

The Session Manager SM checks whether there already exists an SSM that is in the process of creating a session for the packet sender. If this is not the case, it creates one in a step 102; as better detailed in the following, if a session is already established the packets will no longer be sent to the SM but will be routed according to the normal routing table of the router.

As soon as created, the SSM verifies if the user actually wants to create a session through the Session Start Request message (step 104). When such message reaches the SIM, the SIM allows the user to choose whether to create a new session or not. In the former case, the user will also need to enter valid credentials. These credentials, sent by the SIM in a Session Start Accept message (step 106), will be checked by the SSM by means of the Access Request message sent to the AAA server in a step 108. If the credentials are accepted as valid, in a step 112 the SSM creates a new rule in the ACL. This is a rule allowing those packets sent by the user that has just established the session to reach the network resources external to the WG.

In a step 114, the PEN node sends an Accounting Request to the AAA server, thus starting time-based accounting for that user. In a step 116, the AAA server provides an Accounting Response to the PEN node. A similar response is also sent, in a step 118 to the secondary node SEN. Thus the authentication node AAA stores also in the backup node SEN information items concerning the time-based accounting started for the user.

A step 119 in FIG. 3 is representative of the sending of "Keep Alive" messages from the PEN node to the user U to maintain the session.

A session previously established can end due to one of the three following reasons:
- explicit user request,
- exhaustion of pre-paid traffic, or
- missing reception of the keep-alive messages.

Figure 4:
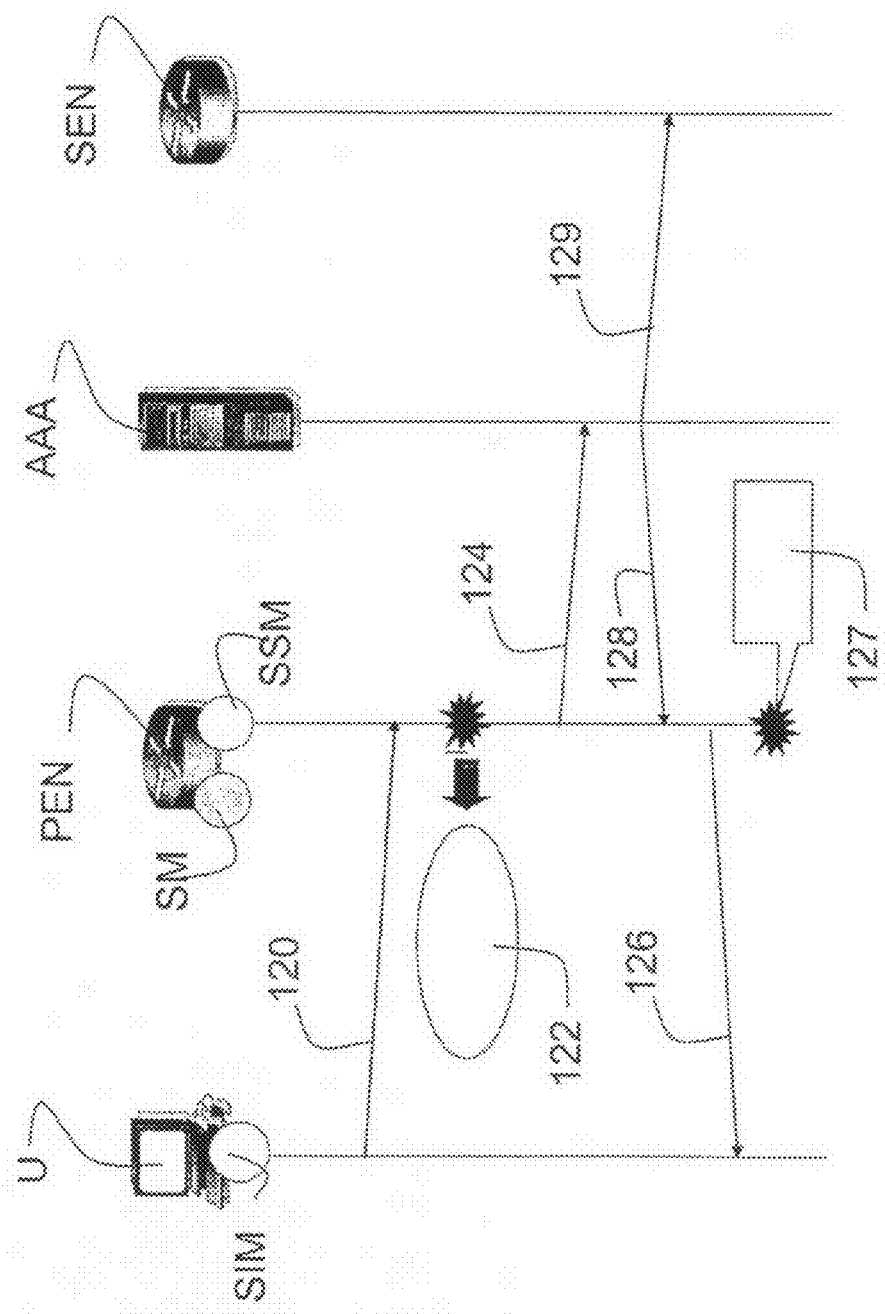

The sequence of operations that leads to the end of the session by explicit request of the user is illustrated in FIG. 4.

When a user U decides to interrupt a session, he first notifies the SIM; the latter in turn sends in a step 120 a Session End Request message to inform the SSM. Upon reception of the message, in a step 122 the SSM modifies the ACL to prevent that further user packets might reach machines external to the WG. Then in a step 124 it sends an Accounting Request (with attribute Acct-Status-Type=Stop) message with which it informs the AAA server about the session duration—i.e. how long the session lasted before being terminated; finally, in a step 126 it sends a Session End Accept message to the SIM of user U to confirm that the session end has occurred. At this point, the SSM—which is no longer necessary—is de-allocated in step 127 thus setting free the related resources on the router.

The diagram of FIG. 4 illustrates also two Accounting Response messages sent in two steps 128 and 129 by the server AAA to the primary edge node PEN and the secondary edge node SEN, respectively. The significance of this latter message will be explained in the following, when discussing the possibility of ensuring protection of an active session in case of failure.

The diagram of FIG. 5 is representative of a session being terminated due the exhaustion of pre-paid payment.

When a user U has a pre-paid credit it is possible that the credit might become exhausted while a session is active. In order to manage that event, the remaining credit is constantly controlled, and, to avoid overloading the router, such control is preferably performed by the AAA server rather than by the SSM.

In a step 130 the AAA server informs the SSM that the credit is exhausted through a Disconnect Message. Upon reception of the message the SSM module replies in a step 132 with a Disconnect Ack and then in a step 134 it modifies the ACL, while in a step 135 it issues an Accounting Request message (with attribute Acct-Status-Type=Stop) to inform the AAA server about the session duration and finally, before being de-allocated in step 136, in step 137 sends to the SIM of user U a Session End Accept message in which it specifies that the session was terminated due to exhaustion of the pre-paid credit.

Although notionally unnecessary, the Accounting Request message forces the AAA server to send an Accounting Response message towards the primary edge node PEN (step 138) and also to the secondary edge node SEN (step 139).

The diagram of FIG. 6 illustrates a session being terminated due to the missing reception of "keep-alive" messages that the SSM and the SIM exchange to mutually control each other's activity.

If such messages are not received the other end is considered as no longer reachable. These messages may no longer be received due to two basic types of causes: the former cause is related to the user machine (e.g. electrical blackout, operating system block); the latter cause is related to the access network (e.g. high congestion and/or node failure). In FIG. 6 the behaviour of the SSM module is shown, while the corresponding behaviour of the SIM module will be better described in the following.

When the SSM module no longer receives the keep-alive messages (step 140), the SSM module considers that the user machine is no longer able to send messages and performs the various steps that lead to the end of the session: firstly it modifies the ACL (step 142); then, in a step 144, it sends the Accounting Request (with attribute Acct-Status-Type=Stop) message. As soon as the Accounting Response message is received (in a step 146), the SSM module is de-allocated in a step 148: sending a Session End Accept message would in fact have no meaning under these circumstances.

Also in this case, the Accounting Response message is sent, in a step 149, also to the secondary edge node SEN.

A management mechanism as just described does not per se guarantee service protection: if the primary edge node PEN fails, all the on-going sessions would be lost. The arrangement described herein is however adapted to ward off such occurrence through the use of a "dual homing" arrangement that takes advantage of the presence of the secondary edge node SEN.

As schematically illustrated in FIG. 7, the underlying fault-tolerant mechanism involves the provision of two edge nodes to permit access to the network I by each users U. Of these two nodes:
- the former, i.e. the primary node PEN, is used by default as an access node, and
- the latter, i.e. the secondary node SEN, is kept at standby, with the possibility of intervening as a backup node to maintain connectivity in the case of a failure involving the primary node PEN.

Irrespective of this functional distinction, those of skill in the art will promptly appreciate that the possibility exists of providing access nodes configured for acting both as:
- a backup node (e.g. as a SEN) to maintain connectivity for a first set of users of the network I in the case of failure of the respective primary access node PEN, and
- a primary node PEN for a second set of users of the network I.

The secondary edge node SEN is able to determine whether the primary node PEN is active or not and to replace it if necessary; the activity of the primary node PEN is monitored through an appropriate mechanism e.g. as provided in protocols such as HSRP (Hot Standby Redundancy Protocol) [IETF RFC 2281] or VRRP (Virtual Router Redundancy Protocol) [IETF RFC 3768].

For the purpose of making the mechanism transparent to the user, an entity in the access network N is present which is able to route the traffic that it receives to the secondary node when the primary one fails. This function is again known per se, thus making it unnecessary to provide a more detailed description.

The secondary node SEN will take on the sessions established on the primary node PEN. The secondary node SEN is therefore dimensioned in order to be able to manage, for example, twice as many sessions as it usually manages.

It is further reasonable to think of protecting in an exclusive manner an established sessions without having to provide a complex synchronization mechanism between the primary node PEN and the secondary node SEN associated thereto. To that end synchronization is performed through the aid of the AAA server, and specifically through the Accounting Response messages sent to confirm reception of the Accounting Request messages. These synchronization messages have been chosen because the Accounting Response sent as a reply of an Accounting Request (with attribute Acct-Status-Type=Start message) can be seen as the event that in fact determines the establishment of the session—see also FIG. 11 and the related description below). Correspondingly, the Accounting Response sent in reply to an Accounting Request with attribute Acct-Status-Type=Stop message can be seen as the event that determines the end of the session (see also FIGS. 4, 5, 6 and 11).

State-of-the-art implementations of AAA servers generally do not provide for sending Accounting Response messages to two receivers; however this can be easily accomplished through additional modules (for example by creating additional modules that can be executed before sending the messages) or through triggers set on the database used by the AAA server. In any case the edge primary node PEN will be able to use a non standard attribute in the Access Request message to inform the AAA server about the address of the secondary edge node SEN.

With reference to the scheme of FIG. 7, when receiving the first Accounting Response message, the SMB module creates a SSMB ready for use in case the primary node PEN fails; however (see also FIG. 15) it does not send any "keep alive" messages until it receives one. The reception of such a message would indicate that the access network is routing the traffic towards the secondary node SEN; this happens only if the primary node PEN fails (step 150). The SSMB is then de-allocated upon reception of the second Accounting Response message (obviously, this occurs if the primary node is not active).

It will be appreciated that an SSMB is created irrespectively of any fault in the primary node PEN, whereby resources are occupied on the router even if these will not be then used; on the other hand, as explained, the secondary node SEN is preferably dimensioned in order to be able to manage also the primary node sessions, whereby a somewhat increased usage of resources does in no way invalidate router performance. To sum up, in case of primary node PEN fails (step 150), the elements shown in FIG. 7 enforce an edge router switch (step 151) so that the faulty primary edge node PEN is substituted by the secondary edge node SEN acting as a backup node.

Thanks to the information stored therein by the authentication node AA concerning the time-based accounting started for the user U when the session has been set up, the backup node SEN is in a position to maintain both connectivity of the user U to the network I and the time-based accounting function for the user U.

The reception of Accounting Response messages on the primary node PEN is ensured by adequate mechanisms (e.g. the Accounting Request messages are re-sent). Preferably, the same approach is not adopted for the secondary node SEN where no retransmission mechanism is foreseen, thus rendering as simple as possible the synchronization mechanism.

As a result of the first Accounting Response message being lost, no SSMB is created, whereby the session will be lost if the primary node PEN fails; similarly, the second message being lost causes the de-allocation of the SSMB being missed, which results in a waste of resources. As regards the former issue, a possible approach involves the use of protocols able to offer a reliable transport incorporating error detection and recovery mechanisms. Concerning the latter issue, standard "garbage collection" techniques can be applied.

As seen in the foregoing, when the access network device finds an error on the main connection (indicative of a problem that can concern the physical link or the primary node), the on-going sessions are diverted on the secondary node; however when the problem is solved (i.e. the fault recovered), being able to bring the sessions previously diverted back to the primary node, thus re-establishing the original situation, has some significance.

Such "switch back" action is illustrated in FIG. 8 and is preceded by a step wherein the SM module is informed as to how many and what sessions have been diverted. That information is derivable from the database used by the AAA server, and in a step 160 a General Update message is sent to the SB server, followed by a sequel of Session Information messages (steps 161 to 16k). After this, in a step 180, a Transfer Complete message is sent by the SBS server to the node PEN.

The management of such transfer is not an excessive load for the primary node PEN since, once reactivated, the node PEN must not forward traffic; a reliable protocol—of any known type—can be used to avoid information losses.

FIG. 9 illustrates in greater detail the reactivation operation of the primary edge node PEN. Here the block 170 indicates as a whole the steps involved in updating the status of the primary edge node PEN, while the block 171 is representative of the edge node switch operation from the secondary node SEN back to the primary node PEN.

A more detailed and formal description will now be given of the entities inherent to the protocol described that is SM, SSM, SIM, SMB, SSMB. The description will start from the messages exchanged between the SSM module and the SIM module. The messages exchanged between the SSM module and the MA server will then be described. Finally, the messages exchanged between the SM module and the SB server will be described.

Messages Exchanged Between the SSM and SIM Modules

The messages exchanged between these two entities are the following:
- Session Start Request (SSR): this is sent by the SSM to the SIM to ask if the user wants to create a session;
- Session Start Accept (SSA): this is sent by the SIM to the SSM to confirm the session creation; in addition it contains the user's credentials;
- Session Start Reject (SSRJ): this is sent by the SIM to the SSM to avoid creating the session;
- Session Start Failed (SSF): this is sent by the SSM to the SIM if the attempt to establish a session is unsuccessful;
- Session End Request (SER): this is sent by the SIM to the SSM to end the session;
- Session End Accept (SEA): this is sent by the SSM to the SIM to confirm the performed session end;
- Keep Alive (KA): this is sent by either by the SIM and by the SSM to verify the connectivity.

Messages Exchanged Between the SSM Module and the AAA Server

The messages exchanged between these two entities are the following:
- Access Request (ACR): this is sent by the SSM to the AAA server to verify the user's credentials;
- Access Accept (M): this is sent by the AAA server to the SSM if the credentials are valid;
- Access Reject (AR): this is sent by the AAA server to the SSM if the credentials are not valid;
- Accounting Request (AREQ): this is sent by the SSM to the AAA server to require the accounting start or end;
- Accounting Response (ARES): this is sent by the AAA server to the SSM (and to the SMB) if the Accounting Request message has been received and correctly registered;
- Disconnect Message (DM): this is sent by the AAA server to the SSM if the credit is exhausted;
- Disconnect Ack (DA): this is sent by the SSM to the MA server to confirm the performed reception of the Disconnect Message.

Messages Exchanged Between the SM Module and the SBS Server

The messages exchanged between these two entities are the following:

General Update (GU): this is sent by the SM to the SB server to require session information;
Session Information (Si): this is sent by the SB server to the SM and contains a part of the necessary information;
Transfer Complete (TC): this is sent by the SB server to the SM when the transfer is ended or it is not necessary.

A further detailed description will now be given of the behaviour of the entities involved implementing the protocol by using the state diagrams.

The formalism used is described below: the notation ex/ay (where x and y are integers) indicates an action "ay" being execution in response to the event "ex"; the event exZ occurs when the event ex occurs for the Z-th time and therefore the automaton changes state following the arch of the exZ event and not the arch of the ex event.

The Table below reports exemplary values for timers adapted to be used in state machines as included in the exemplary embodiment described herein.

| Timer | Value | Meaning | Used by |
|---|---|---|---|
| Timer A | 1 second then doubled at every transmission | Waiting time for retransmitting the SSR to the SIM | SSM |
| Timer B | 1 second then doubled at every transmission | Waiting time for retransmitting the messages to the AAA server | SSM and SSMB |
| Timer C | 15 seconds | Waiting for Session Start | SIM |
| Timer D | 10 seconds | Waiting time keep alive generation | SSM, SIM and SSMB |
| Timer E | 30 seconds | Dead Timer | SSM, SIM and SSMB |
| Timer F | 10 seconds | Waiting for Session End | SIM |

SM Module State Machine

These state machines will now be described starting from the SM state machine shown in FIG. 10. The list of events that are present in FIG. 10 is the following.
e1=Session Information Received.
e2=Transfer Complete Received.
e3=Access attempt received to a resource external to the WG by a user that has not established a session.

Figure 10:
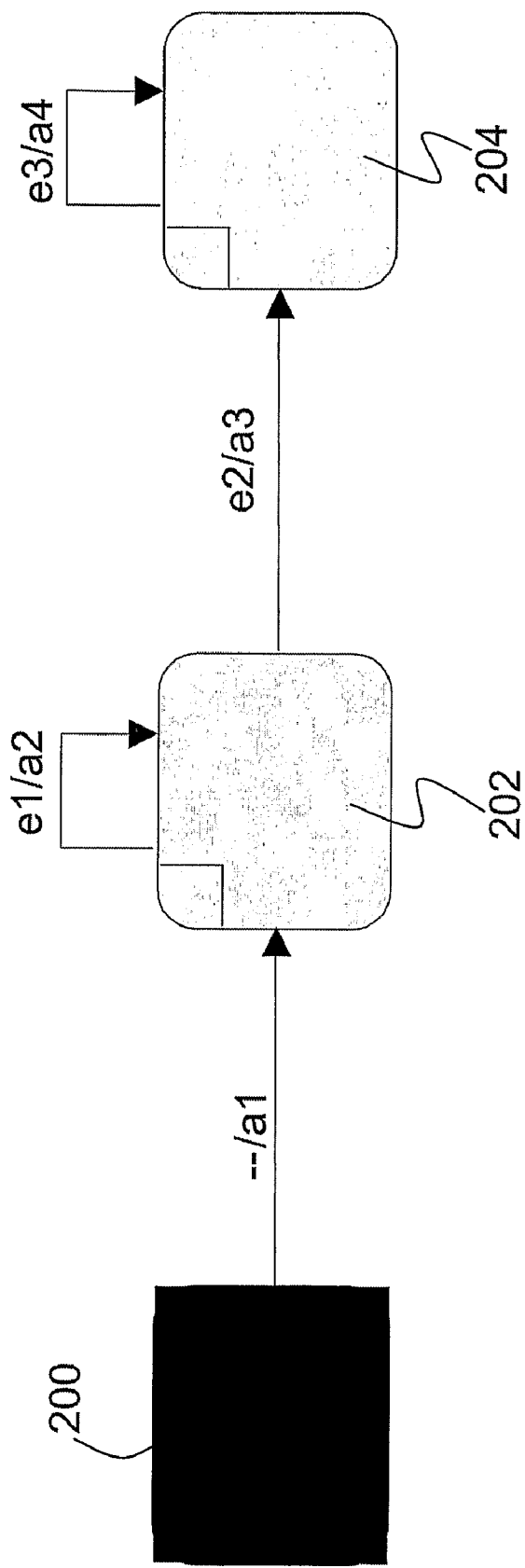

The list of actions present in FIG. 10 is the following.
a1=General Update Forwarding
a2=Received information registration
a3=SSMB creation (if needed)
a4=SSM creation (if needed)

A detailed description will now be given of the states and items (events/actions) present in FIG. 10.

The state 200 (Creation) is not a real and proper state: it merely represents the SM creation and this happens on power up of the primary node. The transition from the state 200 to the state 202 is not determined by any event, but is performed after that the SM has sent the General Update message to the SB server (a1 action).

In a state 202 the SM receives (Updated) information on the sessions diverted during the failover on the secondary node (it is of course possible that no diverted sessions exist); the information is transferred by using the Session Information messages whose reception (e1 event) determines the information registration (a2 action). When the SB server has no information left to send, it sends the Transfer Complete message; reception of this message (e2 event) determines the creation of a SSMB (a3 action) for every diverted session on the secondary node (a3 action) and the transition to a state 204. The Transfer Complete message is sent to the SB server in reply to the General Update message if there is no information to send.

The SM module creates in the state 204 (Active) a SSM (a4 action) for every access attempted to a resource external to the WG by a user that has not established a session (e3 event). In actual fact, before creating a new SSM the SM checks if one already exists; in fact the user machine might send a new packet to a receiver external to the WG before the SSM modifies the ACL.

SSM State Machine

Figure 11:
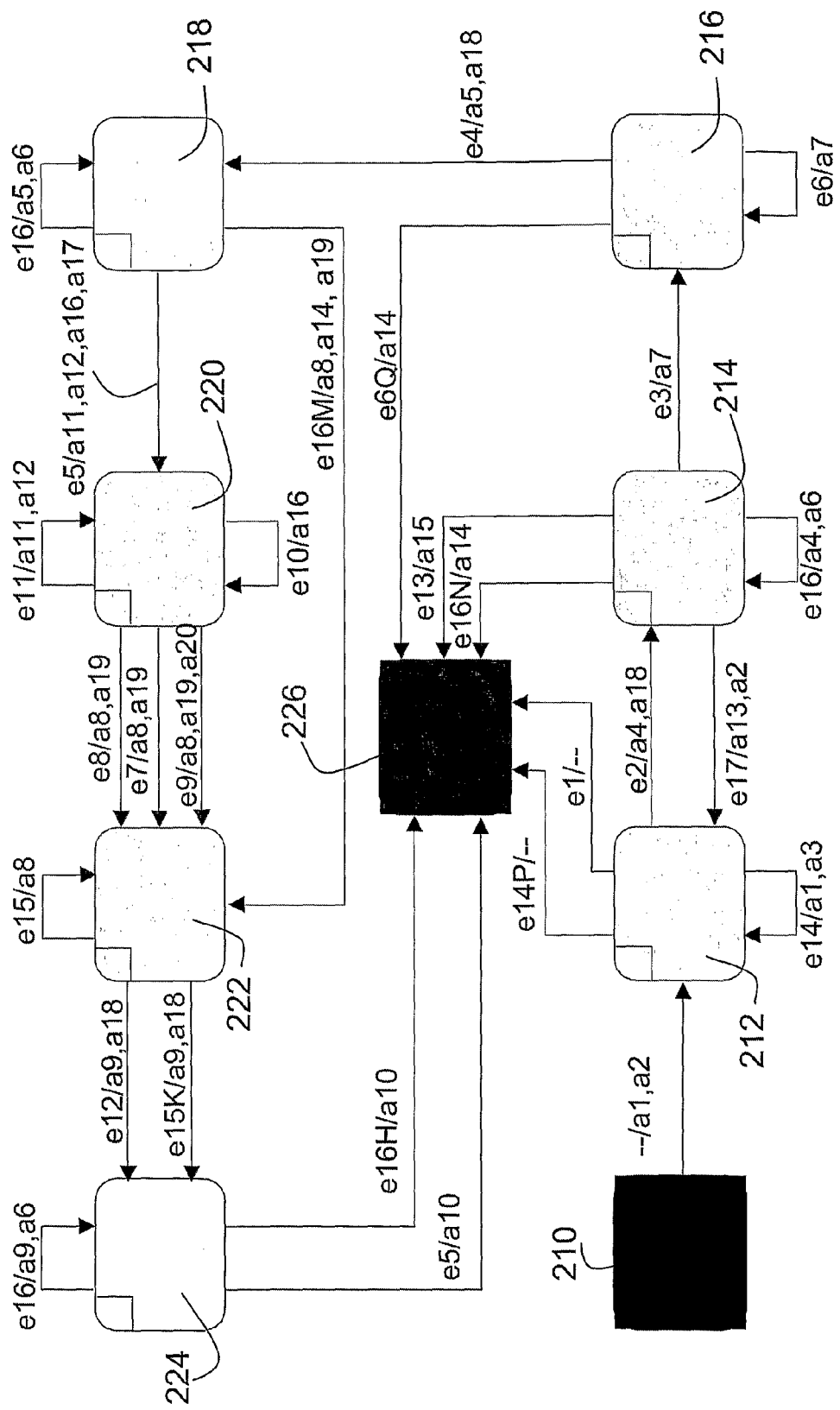

The SSM module state machine is shown in FIG. 11. The list of the events shown in FIG. 11 is the following.
e1=Session Start Reject Received
e2=Session Start Accept Received
e3=Access Accept Received
e4=Policy routing modification successful
e5=Accounting Response Received
e6=Policy routing modification failed
e7=Timer E expired
e8=Session End Request Received
e9=Disconnect Message Received
e10=Keep Alive Received
e11=Timer D expired
e12=Policy routing resetting successful
e13=Access Reject with attribute Exhausted Credit (non standard attribute) Received
e14=Timer A expired
e15=Policy routing resetting failed
e16=Timer B expired
e17=Access Reject with attribute Request Denied Received The list of actions present in FIG. 11 is the following.
a1=Session Start Request Forwarding
a2=Timer A Initialization
a3=Timer A Duration Doubling
a4=Access Request Forwarding
a5=Accounting Request Forwarding (with attribute Acct-Status-Type=Start)
a6=Timer B Duration Doubling
a7=Policy routing modification attempt
a8=Policy routing resetting attempt
a9=Accounting Request Forwarding (with attribute Acct-Status-Type=Stop)
a10=Session End Accept Forwarding (if the session has ended due to event e19 or if the session has lasted 0 seconds it does not send it; with attribute termination-cause=Exhausted Credit if the session is ended due to the event e9)
a11=Keep Alive Forwarding
a12=Timer D Initialization
a13=Session Start Failed Forwarding (with reason attribute=Authentication Failed)
a14=Session Start Failed Forwarding
a15=Session Start Failed Forwarding (with reason attribute=Exhausted Credit)
a16=Timer E Initialization
a17=Start session instant is stored
a18=Timer B Initialization
a19=Session duration calculation
a20=Disconnect Ack Forwarding A detailed description will now be provided of the states and events (events/actions) present in FIG. 11.

The state 210 (Creation) and the state 226 (Destruction) are not real and proper states as they represent the creation or the destruction of the SSM. The transition from the state 210 to a state 212 is not determined by any event and is performed after sending the Session Start Request message (a1 action) and having initialized the timer A (a2 action).

When in the state 212 (Credentials Wait) the SSM is waiting a reply from the user; if the Session Start Accept message (e2 event) arrives the SSM sends the Access Request message to control the user's credentials (a4 action) it initializes in addition the timer B (a18 action) and it moves in a state 214. If, conversely, the Session Start Reject message (e1 event) arrives, the SSM moves in a state 226; finally it the timer A expires (e14 event) the SSM sends again the Session Start Request message (a1 action) and doubles the timer A duration (a3 action) realizing thereby an exponential back off mechanism. The retransmission of the Session Start Request message is repeated P−1 times, when the timer A expires for the P-th time (e14P event) the user is considered as no longer reachable and the SSM moves in the state 226.

In the state 214 (Authentication) the SSM is waiting for a reply from the AAA server, if it receives the Access Accept message (e3 event) it performs an attempt to modify the ACL (a7 action) and moves in a state 216; if, conversely, it receives the Access Reject with attribute Request Denied message (e17 event) it sends the Session Start Failed with attribute failure-cause message equal to Authentication Failed (a13 action), sets the timer A (a2 action) and moves in the state 212 where it awaits that the user enters again it's credentials. Note that the AAA server sends a Access Reject with attribute Request Denied message if the user has incorrectly entered the credentials. The SSM upon reception of the Session Start Failed with attribute Exhausted Credit message (e13 event) sends the Session Start Failed with attribute failure-cause message equal to Exhausted Credit (a15 action) with which it informs the user that the session cannot be created since the credit is exhausted. If instead the timer B expires (e16 event) the SSM sends again the Access Request message (a4 action) and doubles the timer B duration (a6 action) realizing thereby an exponential back off mechanism; the message retransmission is repeated N−1 times, in fact when the timer B expires for the N-th time (e16N event) the AAA server is considered no longer reachable and, after having sent the Session Start Failed message (a14 action) to inform the user that the session has not been created due to technical problems, the SSM moves in the state 226.

In the state 216 (Policy Routing Modification) the SSM waits for the result of the modification of the policy routing: if the result is positive (e4 event) sends the Accounting Request with attribute Acct-Status-Type message equal to a Start (a5 action) to start accounting in addition it initializes the timer B (a18 action) and moves in the state 218; conversely, if the modification is not successful (e6 event) it is repeated (a7 action), the repetition is performed Q−1 times, the Q-th time that the event e6 (e6Q event) occurs after having sent the Session Start Failed message (a14 action) to inform the user that the session has not been created due to technical problems the SSM moves in the state 226.

In the state 218 (Accounting Start) the SSM waits for a reply from the AAA server: if it receives an Accounting Response (e5 event) it sends the keep alive message (a11 action) with which it informs the user that the session has been correctly created, stores the start session instant (a17 action), initializes the timers D (a12 action) and E (a16 action) necessary for the correct management of the keep alive; if instead the timer B (e16 event) expires the SSM sends again the Accounting Request message (a5 action) and doubles the timer B duration (a6 action). Note that the timer B can expire either if the reply has been lost and if the AAA server has not correctly registered the Accounting Request message previously sent. In fact the Radius protocol does not foresee any negative reply to an Accounting Request message. The retransmission is performed M−1 times in fact the M-th time that the event e16 (e16M event) occurs after having performed an attempt to modify the policy routing (a8 action), having sent the Session Start Failed message (a14 action) to inform the user that the session has not been created due to technical problems and having calculated the session duration (a19 action) that in this case is null the SSM moves in the state 222.

In the state 220 (Session Established) the SSM controls the activity of the SIM in fact when the timer D expires (e11 event) a keep alive message is sent (a11 action) in addition the timer D is initialized (a12 action); the arrival of a keep alive (e10 event) determines the initialization of the timer E (a16 action). The SSM considers that the SIM is no longer reachable when the timer E expires (e7 event); such event determines the calculation of the session duration (a19 action), the attempt to modify the policy routing (a8 action) and the transition to state 222. A session can also end due to the exhaustion of the pre-paid credit such event is reported by the AAA server through the Disconnect Message (e9 event) in such case besides calculating the session duration (a19 action) and the attempt to modify the policy routing (a8 action) it sends a Disconnect Ack (a20 action) to the AAA server. The SSM can finally also receive a Session End Request message (e8 event) with which the users asks the session end, in such case the SSM performs the calculation of the session duration (a19 action), the attempt to modify the policy routing (a8 action) before moving in the state 222.

In the state 222 (Policy Routing Resetting) the SSM waits for the result of the policy routing resetting, if this is positive (e12 event) after having sent an Accounting Request with attribute Acct-Status-Type message equal to Stop (a9 action) and having initialized the timer B (a18 action) moves in the state 224; if instead the result is negative (e15 event) if performs a new attempt (a8 action) if after K−1 attempts the resetting is not successful (e15K event) the SSM after having sent an Accounting Request with attribute Acct-Status-Type message equal to Stop (a9 action) and having initialized the timer B (a18 action) moves in the state 224.

In the state 224 (Accounting End) the SSM waits for a reply from the AAA server: if it receives an Accounting Response (e5 event) and if the session has not been ended due to the event e7 or if the session does not have a duration of 0 seconds it sends the Session End Accept message (a10 action) with which it informs the user that the session has been correctly ended (in the message the attribute failure cause equal to Exhausted Credit is present if the session has ended due to event e9); finally the SSM moves in the state 226. Conversely, if the timer B expires (e16 event) the SSM sends again the Accounting Request message (a9 action) and doubles the duration of the timer B (a6 action). The retransmission is performed H−1 timers in fact the H-th time that the event e16 (e16H event) occurs after having sent the Session End Accept message (a10 action) the SSM moves in the state 226.

SIM Module State Machine

Figure 12:
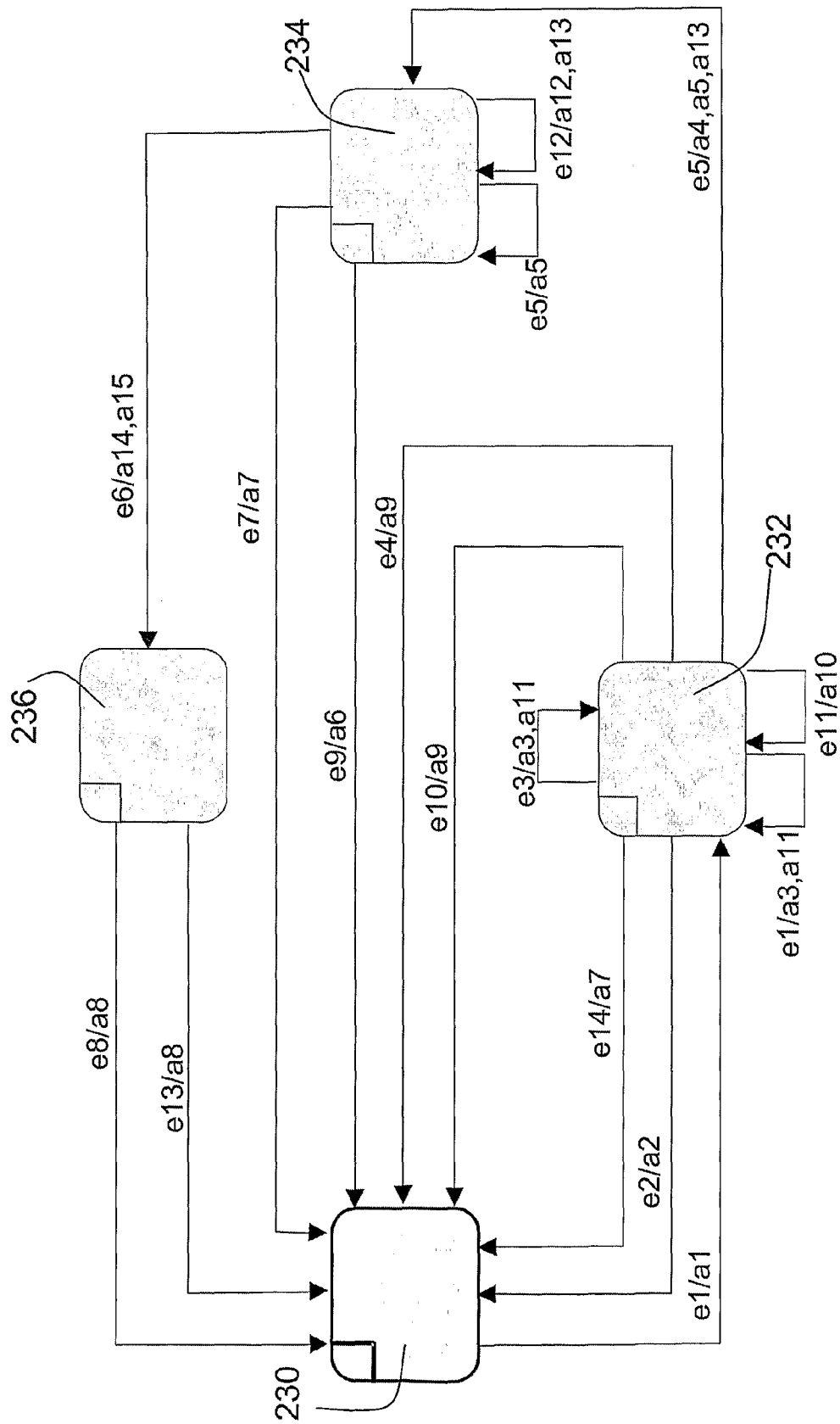

The SIM state machine is shown in FIG. 12. The list of events shown in FIG. 12 is the following.
e1=Session Start Request Received
e2=The user does not want to create the session
e3=The user enters his credentials
e4=Session Start Failed Received
e5=Keep Alive Received e6=The user ends the session
e7=Session End Accept Received (with attribute reason=Exhausted Credit)
e8=Session End Accept Received
e9=Timer E Expired
e10=Timer C Expired
e11=Session Start Failed Received (with attribute reason=Authentication Failed)
e12=Timer D expired
e13=Timer F expired
e14=Session Start Failed Received (with attribute reason=Exhausted Credit)

The list of actions present in FIG. 12 is the following.
a1=The user is asked to enter his credentials
a2=Session Start Reject message forwarding
a3=Session Start Accept message forwarding
a4=The user is informed about the correct session establishment
a5=Timer E Initialization
a6=The user is informed that the session will be ended due to technical problems
a7=The user is informed about the credit exhaustion
a8=The user is informed that the session is ended
a9=The user is informed that it is impossible to establish a session
a10=The user is informed that the credentials have not been accepted and is asked to re-enter them
a11=Timer C Initialization
a12=Keep Alive Forwarding
a13=Timer D Initialization
a14=Session End Request message forwarding
a15=Timer F Initialization A detailed description of the states and items (events/actions) present in FIG. 12 will now be provided.

When in the state 230 (Waiting), the SIM waits for a Session Start Request message, when it receives it (e1 event) it asks the user to enter his credentials (a1 action) finally it moves in the state 232.

In the state 232 (Authentication) the SIM waits that the user enters the credentials (e3 event) to then send them through the Session Start Accept message (a3 action) and initialize the Timer C (a11 action). The reception of a keep alive message (e5 event) entails the performed creation of the session, in reply to such event the SIM informs the user (a4 action) and initializes the timer E (a5 action) and the timer D (a13 action). It is further possible the SSM requires the re-transmission of the Session Start Accept message (e1 event) in such case the SIM sends it (a3 action) and initializes the timer C (a11 action). If the SIM receives the Session Start Failed with attribute failure-cause message equal to Authentication Failed (e11 event) it informs the user that the credentials have not been accepted and asks him to re-enter them (a10 action). Conversely, if the SIM receives the Session Start Failed with attribute failure-cause message equal to Exhausted Credit (e14 event) it informs the user that it is impossible to create the session (a7 action) and moves in the state 230. If instead the SIM receives the Session Start Failed (e4 event) it informs the user that it is impossible to create the session (a9 action) and moves in the state 230. If the user does not want to create the session (e2 event), the SIM sends the Session Start Reject message (a2 action). It is finally possible that the timer C expires (e10 event) in such case the SIM considers the edge node no longer reachable and informs the user that it is impossible to create the session (a9 action) and moves in the state 230.

In the state 234 (Session Established) the SIM controls the SSM activity in fact when the timer D expires (e12 event) a keep alive message is sent (a12 action) timer D is further initialized (a13 action); the arrival of a keep alive (e5 event) determines the initialization of the timer E (a5 action). The SIM considers the SSM no longer reachable when the timer E expires (e9 event); in such case the SIM informs the user that the session will be ended due to technical problems (a6 action) and moves in the state 230. The session can also end if the Session End Accept with attribute termination-cause equal to Exhausted Credit message is received (e7 event) in such case the SIM informs the user of the credit exhaustion (a7 action) and moves in the state 230. It is finally possible that the user decides to end the session (e6 event) in such case the SIM sends a Session End Request message (e14 event), initializes the timer F (e15 event) and moves in the state 236.

In the state 236 (Session End) the SIM waits for a Session End Accept message if it arrives (e8 event) informs the user of the session end (a8 action) and moves in the state 230; even if the timer F expires (e13 event) the SIM informs the user of the session end (a8 action) and moves in the state 230.

It will be appreciated that the Session-Id of the last session is maintained to avoid accidental state changes.

Figure 13:
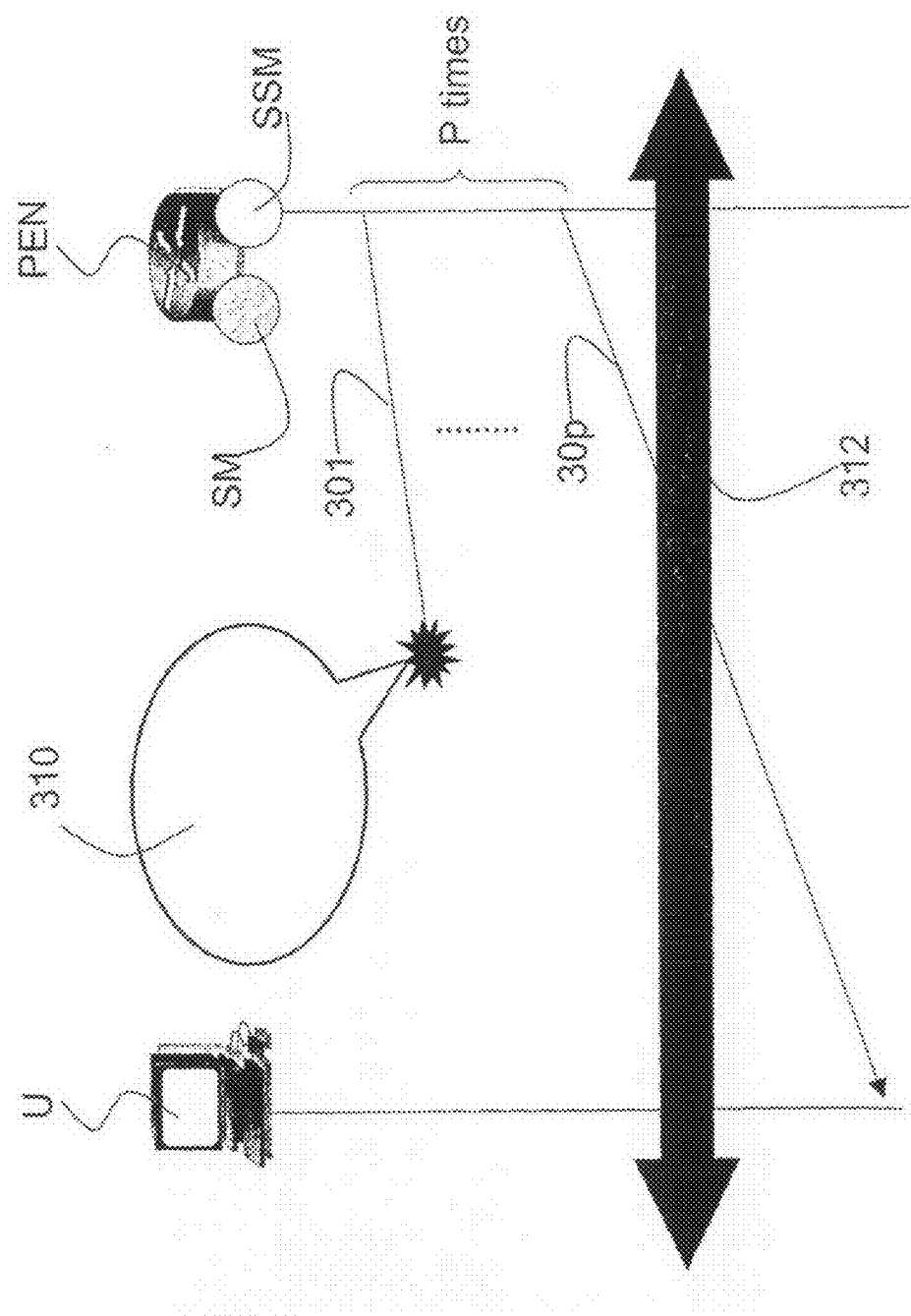

Specifically, the situation shown in FIG. 13 can be considered: there, the steps 301 to 30P correspond to Session Start Requests with Session-Id=1 sent P times and the block 310 is indicative of the exemplary case where all the messages are lost with the exception of the P-th message, which is received with considerable delay. The reference 312 is indicative of a session with Session–Id=2.

If the module SIM were not to store the Session-Id of the last session, it would have no way of knowing that the Session Start Request with Session-Id=1 must be disregarded.

SMB State Machine

Figure 14:
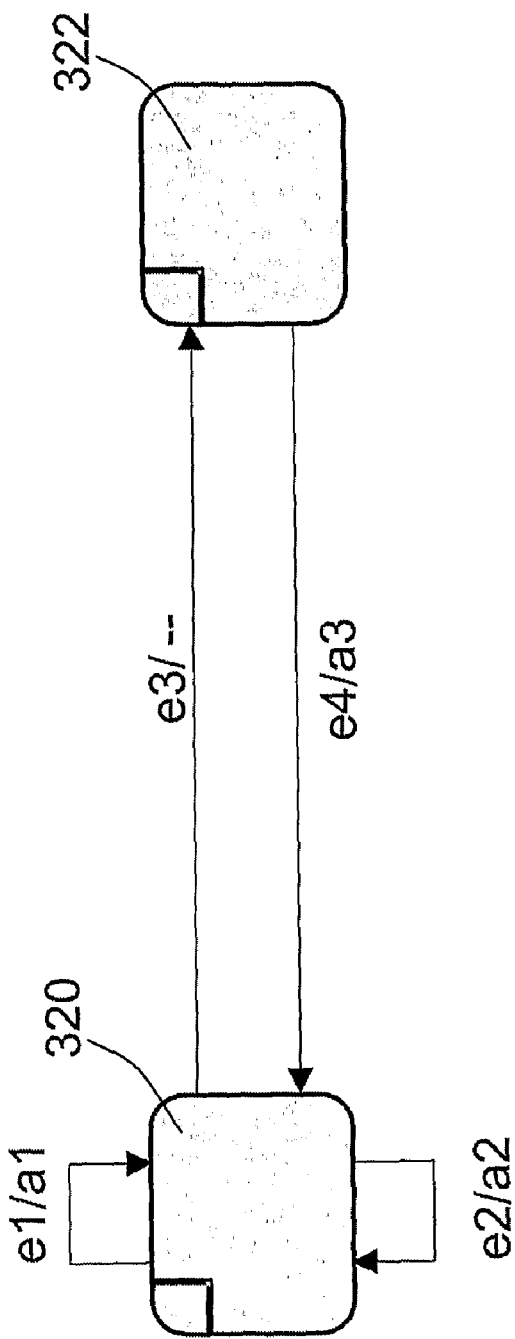

The SMB module state machine is shown in FIG. 14.
The list of events present in FIG. 14 is the following.
e1=Accounting Response Received in reply to an Accounting Request with attribute Acct-Status-type start
e2=Accounting Response Received in reply to an Accounting Request with attribute Acct-Status-type stop
e3=Failure of primary node detected
e4=Activity of primary node detected The list of actions present in FIG. 14 is the following.
a1=Creation of a new SSMB instance
a2=Destruction of the SSMB instance
a3=The SSMBs are informed A detailed description sill now be given of the states and items (events/actions) present in FIG. 14.

When in the state 320 (Start), the SMB creates a new SSMB (a1 action) when it receives an Accounting Response message in reply to an Accounting Request with attribute Acct-Status-Type Start message (e1 event); the SSMB is deleted (a2 action) when an Accounting Response message is received in reply to an Accounting Request with attribute Acct-Status-Type Stop message (e2 event). The detection of the primary node fall (e3 event) determines the transition to the state 322.

In the state 322 (End) the SMB waits for the primary node to return active (e4 event) in such case informs the SSMBs (a3 action) and moves in the state 320.

SSMB Module State Machine

Figure 15:
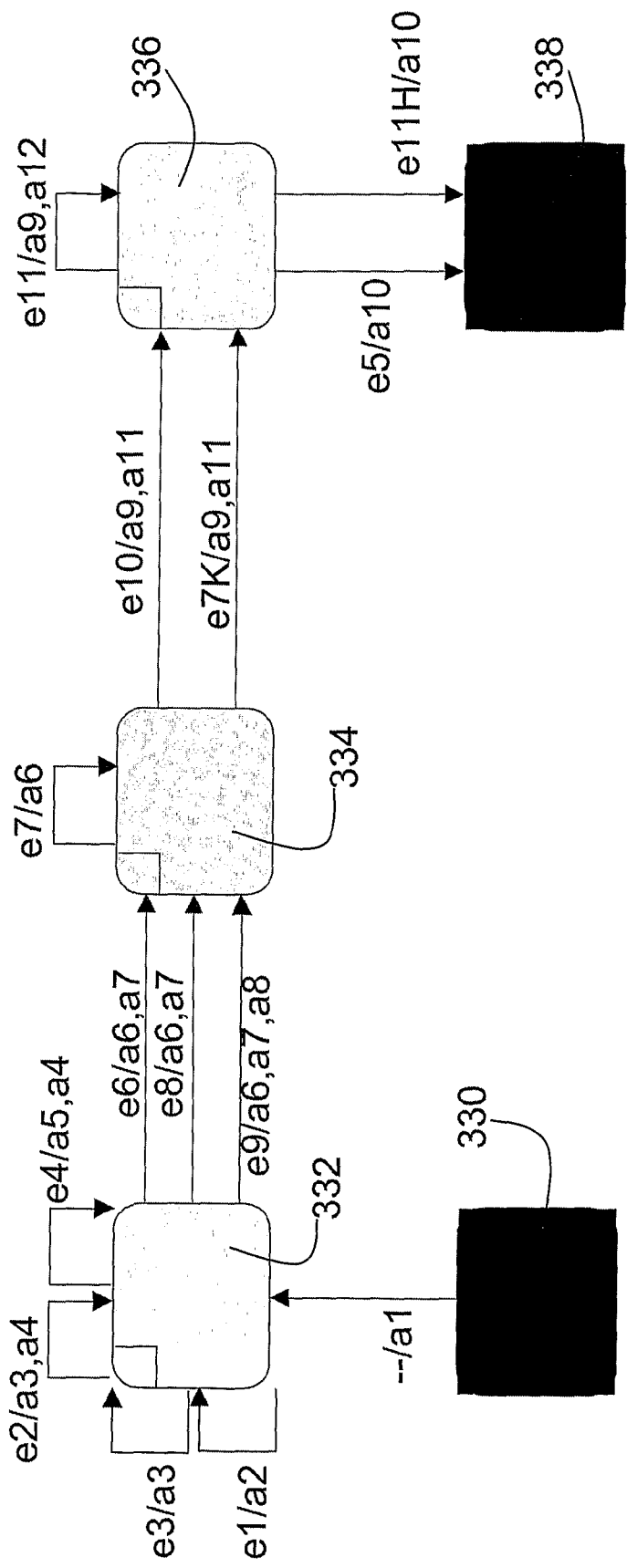

The SSMB module state machine is shown in FIG. 15.
The list of events present in FIG. 15 is the following.
e1=The primary edge node has returned active
e2=First Keep Alive Received
e3=Keep Alive Received
e4=Timer D Expired
e5=Accounting Response Received
e6=Timer E expired e7=Policy routing resetting failed
e8=Session End Response Received
e9=Disconnect Message Received
e10=Policy routing resetting successful
e11=Timer B expired The list of actions present in FIG. 15 is the following.
a1=The start session instant is stored
a2=Timers D and E blocked
a3=Timer E initialization
a4=Timer D initialization
a5=Keep Alive forwarding
a6=Policy routing resetting
a7=Session duration calculation
a8=Disconnect Ack forwarding
a9=Accounting Request forwarding (with attribute Acct-Status-Type=Stop)
a10=Session End Accept forwarding (if the session is ended due to the event a19 it does not send it; with attribute termination-cause=Exhausted Credit if the session is ended due to the event e9)
a11=Timer B initialization.
a12=Timer B duration doubling A detailed description will now be given of the states and items (events/actions) present in FIG. 15.

As already mentioned in the introduction, the SSMB module is a reduced version of the SSM module; in fact it the SSMB module will not deal with the creation of new sessions but it will exclusively manage sessions already created on the primary node.

As a consequence, the description of the states that follows is very similar to the one performed for the SSM.

Again, both states 330 (Creation) and 338 (Destruction) are not a real and proper states but merely represent the creation or the destruction of the SSMB instance. The transition from the state 330 to the state 332 is not determined by any event and is performed after having stored the session start instant (a1 action).

Before entering the state 332 (Session Established) the SSMB does not initialize the timers D and E therefore the keep alive mechanism will not be active; the reception of the first keep alive (e2 event) will cause the initialization of the timers E (a3 action) and D (a4 action) and therefore the mechanism activation.

Such choices are motivated by the fact that the SSMB is preferably used only when the primary node fails, so that it would not make sense to send keep alive messages if these are also sent by a SSM in execution on the primary node. When the timer D expires (e4 event) a keep alive message is sent (a5 action) the timer D is further initialized (a4 action); the arrival of a keep alive (e3 event) determines the initialization of the timer E (a3 action). The SSM considers the SIM no longer reachable when the timer E expires (e6 event); such event determines the calculation of the session duration (a7 action), the attempt to modify the policy routing (a6 action) and the transition to the state 334. As seen previously, a session can end also because the pre-paid credit has been exhausted such event is reported by the AAA server through the Disconnect Message message (e9 event) in such case besides calculating the session duration (a7 action) and the attempt to modify the policy routing (a6 action) a Disconnect Ack is sent (a8 action) to the AAA server. The SSMB module can also receive a Session End Request message (e8 event) by means of which the user asks to end the session. The SSMB performs the session duration calculation (a7 action) and the attempt to modify the policy routing (a6 action) before returning to the state 334. Finally the primary node can return active (e1 event); this determines the block of timers D and E (a2 action) because when the primary node returns active it will have a SSMB to manage the session.

In the state 334 (Policy Routing Resetting) the SSMB module waits for the result of the policy routing resetting, if this is positive (e10 event), after having sent an Accounting Request with attribute Acct-Status-Type message equal to Stop (a9 action) and having initialized the timer B (a11 action), the SSM moves in the state 336; conversely, if the result is negative (e7 event), a new attempt is made (a6 action) if after K−1 attempts the resetting is unsuccessful (e7K event), after having sent an Accounting Request with attribute Acct-Status-Type message equal to Stop (a9 action) and having initialized the timer B (a11 action), the SSMB module moves in the state 336.

In the state 336 (Accounting End) the SSMB module waits for a reply from the AAA server: if it receives an Accounting Response (e5 event) and the session is not ended due to the e6 event or if the session does not have the duration of 0 seconds, it sends a Session End Accept message (a10 action) by means of which it informs the user that the session has been correctly ended (in the message the attribute failure cause=Exhausted Credit is present if the session is ended due to the e9 event); finally the SSMB moves in the state 338. Conversely, if the timer B expires (e11 event) the SSMB sends again the Accounting Request message (a9 action) and doubles the timer B duration (a12 action) therefore implementing an exponential backoff mechanism. The re-transmission is performed H−1 times; the H-th time that the e11 events occurs (e11H event), the Session End Accept message is sent (a10 action) and the SSMB module moves in the state 338.

Consequently, without prejudice to the underlying principles of the invention, the details and the embodiments may vary, even appreciably, with reference to what has been described by way of example only, without departing from the scope of the invention as defined by the annexed claims. For instance, the arrangement described herein can be configured for jointly providing access to services provided by the data network I also to users whose access is accounted on a flat, time-independent basis.

The invention claimed is:

1. A method for the time-based accounting of access by users of services provided by a data network, wherein said access by users is provided via at least one primary access node by establishing via said at least one primary access node a steady connectivity between the users and the data network, comprising the steps of:
associating with said at least one primary access node at least one secondary access node configured for acting as a backup node to maintain said connectivity in the case of failure involving said at least one primary access node;
providing an authentication node cooperative with said at least one primary access node and said at least one secondary access node;
issuing a request for credentials for a user among said users requesting access to said data network;
as a result of receiving valid credentials from said user, starting time-based accounting for said user,
said authentication node storing in said at least one secondary access node, information items concerning said time-based accounting started for said user, whereby said time-based accounting for said user is maintained in the case of failure involving said at least one primary access node as said connectivity is maintained by said at least one secondary access node; and once said failure involving said at least one primary access node is cleared, re-establishing both said connectivity and said time-based accounting for said user via said at least one primary access node.

2. The method of claim 1, comprising the step of issuing said request for credentials from said at least one primary access node.

3. The method of claim 1, comprising the step of said at least one primary access node detecting any said user requesting access to said data network by detecting a user packet destination within said data network.

4. The method of claim 1, comprising the step of jointly providing access to services provided by said data network to users whose access is accounted on a time-independent basis.

5. The method of claim 1, comprising the step of terminating said time-based accounting started for said user upon a request from said user.

6. The method of claim 5, comprising the step of sending to said at least one secondary access node a message indicative of said time-based accounting being terminated.

7. The method of claim 1, comprising the step of terminating said time-based accounting started for said user upon exhaustion of pre-paid payment of said accounting.

8. The method of claim 1, comprising the step of terminating said time-based accounting started for said user upon missing reception of messages to keep alive said steady connectivity.

9. The method of claim 1, comprising the step of providing at least one access node configured for acting both as:
   a backup node to maintain connectivity for a first set of users of said network in the case of failure of at least one respective primary access node; and
   a primary node for a second set of users of said network.

10. A non-transitory computer readable storage medium encoded with a computer program product, the computer program product being loadable into a memory of at least one computer and comprising software code portions for performing the method of claim 1.

11. A system for time-based accounting of access by users to services provided by a data network, comprising at least one primary access node to provide said access by users by establishing via said at least one primary access node, a steady connectivity between the users and the data network, comprising:
   at least one secondary access node associated with said at least one primary access node, said at least one secondary access node configured for acting as a backup node to maintain said connectivity in case of failure involving said at least one primary access node;
   an authentication node cooperative with said at least one primary access node and said at least one secondary access node;
   a system element configured for issuing a request for credentials for a user among said users requesting access to said data network and, as a result of receiving valid credentials from said user, starting time-based accounting for said user,
   said authentication node configured for storing in said at least one secondary access node information items concerning said time-based accounting started for said user, whereby said time-based accounting for said user is maintained in the case of failure involving said at least one primary access node as said connectivity is maintained by said at least one secondary access node; and
   a system device configured to re-establish both said connectivity and said time-based accounting for said user via said at least one primary access node once said failure involving said at least one primary access node is cleared.

12. The system of claim 11, wherein said system element configured for issuing said request for credentials is said at least one primary access node.

13. The system of claim 11, comprising at least one primary access node configured for detecting any said user requesting access to said data network by detecting a user packet destination within said data network.

14. The system of claim 11, comprising a configuration for jointly providing access to services provided by said data network and to users whose access is accounted on a time-independent basis.

15. The system of claim 11, comprising a configuration for terminating said time-based accounting started for said user upon a request from said user.

16. The system of claim 15, comprising at least one secondary access node configured for receiving a message indicative of said time-based accounting being terminated.

17. The system of claim 11, comprising a configuration for terminating said time-based accounting started for said user upon exhaustion of pre-paid payment of said accounting.

18. The system of claim 11, comprising a configuration for terminating said time-based accounting started for said user upon missing reception of messages to keep alive said steady connectivity.

19. The system of claim 11, comprising at least one access node configured for acting both as:
   backup node to maintain connectivity for a first set of users of said network in the case of failure of at least one respective primary access node; and
   a primary node for a second set of users of said network.

20. The system of claim 11, comprising at least one primary access node and at least one secondary access node configured for assuring both said connectivity and said time-based accounting for said user via said at least one primary access node once said failure involving said at least one primary access node is cleared.

21. The system of claim 11, comprising:
   respective state machines, session initiator modules, session manager modules, single session manager modules, session manager backup modules, and single session manager backup modules,
   at said user provided with access to said data network,
   at said at least one primary access node, and
   at said at least one secondary access node,
   said connectivity and said time-based accounting for said user being provided via sessions of interaction of said state machine, session manager module, at said user provided with access to said data network with the respective state machines, session manager modules, single session manager modules, session manager backup modules, and single session manager backup modules, at said at least one primary access node, and at said at least one secondary access node, respectively.

22. The system of claim 21, comprising the respective state machine, session manager, module and single session manager module, at said at least one primary access node configured with the capability of setting up a session of interaction with said state machine, session initiator module, at said user provided with access to said data network.

23. The system of claim 22, comprising the respective state machine, session manager backup module and single session manager backup module; at said at least one secondary access node being a simplified version of the respective state machine, session manager module and single session manager module, at said at least one primary access node, said simplified version, session manager backup module and single session backup manager module, lacking the capability of setting up a session of interaction with said state machine at said user provided with access to said data network.

24. A data network providing users access to services by means of at least one primary access node establishing a steady connectivity between the users and the network comprising the system of claim 11.

* * * * *